US011303731B2

(12) United States Patent
Gupta et al.

(10) Patent No.: US 11,303,731 B2
(45) Date of Patent: Apr. 12, 2022

(54) METHOD AND APPARATUS FOR REGISTERING API PROVIDER DOMAIN FUNCTION ENTITIES ON CAPIF CORE FUNCTION ENTITY

(71) Applicant: Samsung Electronics Co., Ltd., Suwon-si (KR)

(72) Inventors: Nishant Gupta, Bangalore (IN); Basavaraj Jayawant Pattan, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/792,624

(22) Filed: Feb. 17, 2020

(65) Prior Publication Data

US 2020/0267238 A1  Aug. 20, 2020

(30) Foreign Application Priority Data

Feb. 16, 2019  (IN) .............................. 201941006184
Jan. 30, 2020  (IN) .............................. 201941006184

(51) Int. Cl.
*G06F 3/00* (2006.01)
*H04L 67/133* (2022.01)
(Continued)

(52) U.S. Cl.
CPC ............... *H04L 67/40* (2013.01); *G06F 9/54* (2013.01); *H04L 41/0806* (2013.01); *H04L 67/34* (2013.01)

(58) Field of Classification Search
CPC ..................................................... G06F 9/541
(Continued)

(56) References Cited

U.S. PATENT DOCUMENTS 8,793,359 B1 *  7/2014  Fiebig ................. G06F 11/3051
                                                                            709/223
10,942,794 B2 *  3/2021  Pattan ................... H04M 15/00
(Continued)

FOREIGN PATENT DOCUMENTS

WO  2018203663 A1  11/2018

OTHER PUBLICATIONS

Muhammad Imran, Restful web services security by using asp.net web API MVC based. (Year: 2014).*
(Continued)

*Primary Examiner* — Lechi Truong

(57) ABSTRACT

The present disclosure relates to a pre-5$^{th}$-Generation (5G) or 5G communication system that supports higher data rates Beyond 4$^{th}$-Generation (4G) communication system. A method includes receiving the registration request message from an AMF entity; validating the registration request message based on the security information; generating configuration information of at least one API provider domain function entity from the list of the API provider domain function entities that successfully registered with a CAPIF core function entity; sending the response message to the AMF entity; receiving the registration update request message from the AMF entity; validating the registration update request message based on the security information; updating configuration information of at least one API provider domain function entity from the list of the API provider domain function entities that successfully updated with the CAPIF core function entity; and, sending the registration update response message to the AMF entity.

24 Claims, 10 Drawing Sheets

(51) Int. Cl.
*H04L 41/0806* (2022.01)
*H04L 67/00* (2022.01)
*G06F 9/54* (2006.01)

(58) Field of Classification Search
USPC .......................................................... 719/328
See application file for complete search history.

(56) References Cited

U.S. PATENT DOCUMENTS

| | | | | |
|---|---|---|---|---|
| 2012/0016861 | A1* | 1/2012 | Edwards | G06F 16/48 |
| | | | | 707/707 |
| 2015/0058444 | A1* | 2/2015 | Willmann | G06F 9/545 |
| | | | | 709/217 |
| 2016/0350261 | A1* | 12/2016 | Tsirkin | G06F 12/0292 |
| 2021/0037007 | A1* | 2/2021 | Gupta | H04L 63/0884 |
| 2021/0144550 | A1* | 5/2021 | Ito | H04W 12/06 |
| 2021/0320923 | A1* | 10/2021 | Xu | H04L 63/164 |

OTHER PUBLICATIONS

J.W. Hellenthal, Validation of the Parlay API through prototyping. (Year: 2001).*
Michael Starsinic, An Overview of 3GPP Exposed Services For IoT Service Platforms, (Year: 2018).*
3GPP TS 23.222 V16.3.0 (Mar. 2019), Technical Specification, 3rd Generation Partnership Project; Technical Specification Group Services and System Aspects; Functional architecture and information flows to support Common API Framework for 3GPP Northbound APIs; Stage 2 (Release 16), Mar. 2019, 112 pages.
Samsung Electronics, "Architectural requirements for registration of API provider domain functions," S6-190423 (revision of S6-190380), 3GPP TSG-SA WG6 Meeting #29, Montréal, Canada, Feb. 25-Mar. 1, 2019, 2 pages.
Samsung Electronics, "Procedures for registration of API provider domain functions," S6-190494 (revision of S6-190424 was 0381), 3GPP TSG-SA WG6 Meeting #29, Montréal, Canada, Feb. 25-Mar. 1, 2019, 6 pages.
European Search Report in connection with European Application No. 20157615.4 dated Jun. 26, 2020, 9 pages.
International Search Report and Written Opinion in connection with International Application No. PCT/KR2020/002248 dated Jun. 5, 2020, 11 pages.
3GPP TS 23.222 V16.2.0 (Dec. 2018), Technical Specification, 3rd Generation Partnership Project; Technical Specification Group Services and System Aspects; Functional architecture and information flows to support Common API Framework for 3GPP Northbound APIs; Stage 2 (Release 16), Dec. 2018, 99 pages.
Oppo, "RACS_Update paper on solution #12," S2-1900208, SA WG2 Meeting #130, Kochi, India, Jan. 21-25, 2019, 5 pages.
3GPP TR 23.722 V15.1.0 (Apr. 2018), Technical Report, 3rd Generation Partnership Project; Technical Specification Group Services and System Aspects; Study on Common API Framework for 3GPP Northbound APIs; (Release 15), Apr. 2018, 65 pages.
3GPP TR 23.742 V16.0.0 (Dec. 2018), Technical Report, 3rd Generation Partnership Project; Technical Specification Group Services and System Aspects; Study on Enhancement to the Service-Based Architecture; (Release 16), Dec. 2018, 130 pages.
Communication pursuant to Article 94(3) EPC dated Mar. 26, 2021 in connection with European Application No. 20157615.4, 8 pages.
Communication pursuant to Article 94(3) EPC dated Sep. 2, 2021, in connection with European Application No. 20157615.4, 6 pages.
Examination report dated Oct. 26, 2021, in connection with Indian Application No. 201941006184, 7 pages.

* cited by examiner

METHOD AND APPARATUS FOR REGISTERING API PROVIDER DOMAIN FUNCTION ENTITIES ON CAPIF CORE FUNCTION ENTITY

CROSS-REFERENCE TO RELATED APPLICATIONS

This application is based on and claims priority under 35 U.S.C. § 119 to Indian Patent Application No. 201941006184, filed on Feb. 16, 2019, and Indian Patent Application No. 201941006184, filed on Jan. 30, 2020, in the Indian Intellectual Property Office, the disclosures of which are incorporated by reference herein in their entirety.

BACKGROUND

1. Field

The present disclosure relates to a Common Application Programming Interface Frameworks (CAPIF), and more specifically related to a method and apparatus for registering API provider domain function entities on a CAPIF core function entity.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In release-15 of 3rd Generation Partnership Project (3GPP), a Common Application Programming Interface Frameworks (CAPIF) core function is limited to a Public Land Mobile Network (PLMN) deployed API provider domain function entities i.e. only the PLMN is allowed to expose, publish and manage APIs using the CAPIF core function. In release-16 of 3GPP, with advent of a 3rd party API provider domain, any API based service provider can expose, publish and manage APIs using the CAPIF core function. With this change, there is a need to establish a trust domain between the CAPIF core function and the 3rd party API provider domain. This can be a cumbersome task if done manually. An automated solution is therefore needed.

Thus, it is desired to address the above mentioned disadvantages or other shortcomings or at least provide a useful alternative.

SUMMARY

Accordingly, the embodiments herein provide a method and apparatus for registering Application Programming Interface (API) provider domain functions on a Common API Frameworks (CAPIF) core function entity. The method includes receiving, by the CAPIF core function entity, a registration request message from an API management function (AMF) entity, where the registration request comprises security information to validate the registration request and a list of API provider domain function entities that require registration on the CAPIF core function entity. Further, the method includes validating, by the CAPIF core function entity, the registration request message received from the AMF entity based on the security information. Further, the method includes generating, by the CAPIF core function entity, configuration information of at least one API provider domain function entity from the list of the API provider domain function entities that is successfully registered with the CAPIF core function entity on the basis of validation. Further, the method includes sending, by the CAPIF core function entity, a registration response message to the AMF entity, where the registration response message comprises the configuration information of the at least one API provider domain function entity that is successfully registered with the CAPIF core function entity.

In an embodiment, generating, by the CAPIF core function entity, the configuration information of at least one API provider domain function entity from the list of the API provider domain function entities that is successfully registered with the CAPIF core function entity includes determining, by the CAPIF core function entity, whether the list of the API provider domain function entities is successfully registered with the CAPIF core function entity, and performing, by the CAPIF core function entity, one of.

In an embodiment, performing one of comprises generating the configuration information of the at least one API provider domain function entity from the list of the API provider domain function entities that is successfully registered with the CAPIF core function entity in response to determining that the at least one API provider domain function entity is successfully registered with the CAPIF core function entity, where the configuration information comprises identities of the at least one API provider domain function entity that is successfully registered with the CAPIF core function entity, a security information to be used by the API provider domain function entity in subsequent CAPIF API invocations for the at least one API provider domain function entity that is successfully registered with the CAPIF core function entity, and a reason for failure of remaining API provider domain function entity from the list of API provider domain function entities.

In an embodiment, performing one of comprises generating the configuration information of the list of the API provider domain function entities that is successfully registered with the CAPIF core function entity in response to determining that all the API provider domain function entity listed in the registration request message are successfully registered with the CAPIF core function entity, where the configuration information comprises a list of identities of the API provider domain function entity that is successfully registered with the CAPIF core function entity, and a security information to be used by the API provider domain function entity in subsequent CAPIF API invocations for all the API provider domain function entity that are successfully registered with the CAPIF core function entity.

In an embodiment, performing one of comprises generating the configuration information comprising a reason for failure of all the API provider domain function entity from the list of API provider domain function entities in response to determining that all the API provider domain function entity listed in the registration request message are not successfully registered with the CAPIF core function entity.

In an embodiment, the method further includes receiving, by the CAPIF core function entity, a registration update request message from the AMF entity, where the registration update request comprises security information to validate the registration update request and a list of API provider domain function entities that require registration update on the CAPIF core function entity. Further, the method includes validating, by the CAPIF core function entity, the registration update request message received from the AMF entity based on the security information. Further, the method includes updating, by the CAPIF core function entity, configuration information of at least one API provider domain function entity from the list of the API provider domain function entities that is successfully updated with the CAPIF core function entity on the basis of validation. Further, the method includes sending, by the CAPIF core function entity, a registration update response message to the AMF entity, where the registration update response message comprises the configuration information of the at least one API provider domain function entity that is successfully updated with the CAPIF core function entity.

In an embodiment, updating, by the CAPIF core function entity, the configuration information of at least one API provider domain function entity from the list of the API provider domain function entities that is successfully updated with the CAPIF core function entity includes determining, by the CAPIF core function entity, whether the list of the API provider domain function entities is successfully updated registration with the CAPIF core function entity, and performing, by the CAPIF core function entity, one of.

In an embodiment, performing one of comprises generating the configuration information of the at least one API provider domain function entity from the list of the API provider domain function entities that is successfully updated registration with the CAPIF core function entity in response to determining that the at least one API provider domain function entity is successfully updated with the CAPIF core function entity, where the configuration information comprises identities of the at least one API provider domain function entity that is successfully updated registration with the CAPIF core function entity, a security information to be used by the API provider domain function entity in subsequent CAPIF API invocations for the at least one API provider domain function entity that is successfully updated registration with the CAPIF core function entity, and a reason for failure of remaining API provider domain function entity from the list of API provider domain function entities.

In an embodiment, performing one of comprises generating the configuration information of the list of the API provider domain function entities that is successfully updated registration with the CAPIF core function entity in response to determining that all the API provider domain function entity listed in the registration request message are successfully updated registration with the CAPIF core function entity, where the configuration information comprises a list of identities of the API provider domain function entity that is successfully updated registration with the CAPIF core function entity, and a security information to be used by the API provider domain function entity in subsequent CAPIF API invocations for all the API provider domain function entity that are successfully updated registration with the CAPIF core function entity.

In an embodiment, performing one of comprises generating the configuration information comprising a reason for failure of all the API provider domain function entity from the list of API provider domain function entities in response to determining that all the API provider domain function entity listed in the registration request message are not successfully updated registration with the CAPIF core function entity.

Accordingly, the embodiments herein provide a method and apparatus for registering API provider domain function entities on a Common Application Programming Interface Frameworks (CAPIF) core function entity. The method includes sending, by an API management function (AMF) entity, a registration request message to the CAPIF core function entity, where the registration request comprises security information to validate the registration request and a list of API provider domain function entities that require registration on the CAPIF core function entity. Further, the method includes receiving, by the AMF entity, a registration response message from the CAPIF core function entity, where the registration response message comprises the configuration information of the at least one API provider domain function entity that is successfully registered with the CAPIF core function entity on the basis of validation. Further, the method includes configuring, by the AMF entity, the received configuration information to the individual API provider domain function entities.

In an embodiment, the configuration information comprises identities of the at least one API provider domain function entity that is successfully registered with the CAPIF core function entity, a security information to be used by the API provider domain function entity in subsequent CAPIF API invocations and a reason for failure of remaining API provider domain function entity from the list of API provider domain function entities when the at least one API provider domain function entity is successfully registered with the CAPIF core function entity.

In an embodiment, the configuration information comprises a list of identities of the API provider domain function entity that is successfully registered with the CAPIF core function entity and security information to be used by the API provider domain function entity in subsequent CAPIF API invocations for all the API provider domain function entity that are successfully registered with the CAPIF core function entity when all the API provider domain function entity listed in the registration request message are successfully registered with the CAPIF core function entity.

In an embodiment, the configuration information comprising a reason for failure of all the API provider domain function entity from the list of API provider domain function entities when all the API provider domain function entity listed in the registration request message are not successfully registered with the CAPIF core function entity.

In an embodiment, the method further includes sending, by the AMF entity, a registration update request message to the CAPIF core function entity, where the registration update request comprises security information to validate the registration request and a list of API provider domain function entities that require registration on the CAPIF core function entity. Further, the method includes receiving, by the AMF entity, a registration update response message from the CAPIF core function entity, where the registration update response message comprises the configuration information of the at least one API provider domain function entity that is successfully updated registration with the CAPIF core function entity on the basis of validation. Further, the method includes configuring, by the AMF entity, the received updated configuration information to the individual API provider domain function entities.

In an embodiment, the updated configuration information comprises identities of the at least one API provider domain function entity that is successfully updated registration with the CAPIF core function entity, a security information to be used by the API provider domain function entity in subsequent CAPIF API invocations for the at least one API provider domain function entity that is successfully updated registration with the CAPIF core function entity, and a reason for failure of remaining API provider domain function entity from the list of API provider domain function entities when the at least one API provider domain function entity is successfully updated registration with the CAPIF core function entity.

In an embodiment, the updated configuration information comprises a list of identities of the API provider domain function entity that is successfully updated registration with the CAPIF core function entity and security information to be used by the API provider domain function entity in subsequent CAPIF API invocations for all the API provider domain function entity that are successfully updated registration with the CAPIF core function entity when all the API provider domain function entity listed in the registration request message are successfully updated registration with the CAPIF core function entity.

In an embodiment, the updated configuration information comprising a reason for failure of all the API provider domain function entity from the list of API provider domain function entities when all the API provider domain function entity listed in the registration request message are not successfully updated registration with the CAPIF core function entity.

Accordingly, the embodiments herein provide a Common Application Programming Interface Framework (CAPIF) core function entity for registering API provider domain function entities. The CAPIF core function entity includes a processor and a memory. The processor is configured to receive a registration request message from an API management function (AMF) entity, where the registration request comprises security information to validate the registration request and a list of API provider domain function entities that require registration on the CAPIF core function entity. Further, the processor is configured to validate the registration request message received from the AMF entity based on the security information. Further, the processor is configured to generate configuration information of at least one API provider domain function entity from the list of the API provider domain function entities that is successfully registered with the CAPIF core function entity on the basis of validation. Further, the processor is configured to send a registration response message to the AMF entity, where the registration response message comprises the configuration information of the at least one API provider domain function entity that is successfully registered with the CAPIF core function entity.

In an embodiment, further, the processor is configured to receive a registration update request message from the AMF entity, where the registration update request comprises security information to validate the registration update request and a list of API provider domain function entities that require registration update on the CAPIF core function entity. Further, the processor is configured to validate the registration update request message received from the AMF entity based on the security information. Further, the processor is configured to update configuration information of at least one API provider domain function entity from the list of the API provider domain function entities that is successfully updated with the CAPIF core function entity on the basis of validation. Further, the processor is configured to send a registration update response message to the AMF entity, where the registration update response message comprises the configuration information of the at least one API provider domain function entity that is successfully updated with the CAPIF core function entity.

Accordingly, the embodiments herein provide an Application Programming Interface management function (AMF) entity for registering API provider domain function entities on a Common API Framework (CAPIF) core function entity. The AMF entity includes a processor and a memory. The processor is configured to send a registration request message to the CAPIF core function entity, where the registration request comprises security information to validate the registration request and a list of API provider domain function entities that require registration on the CAPIF core function entity. Further, the processor is configured to receive a registration response message from the CAPIF core function entity, where the registration response message comprises the configuration information of the at least one API provider domain function entity that is successfully registered with the CAPIF core function entity on the basis of validation. Further, the processor is configured to configure the received configuration information to the individual API provider domain function entities.

In an embodiment, further, the processor is configured to send a registration update request message to the CAPIF core function entity, where the registration update request comprises security information to validate the registration request and a list of API provider domain function entities that require registration on the CAPIF core function entity. Further, the processor is configured to receive a registration update response message from the CAPIF core function entity, where the registration update response message comprises the configuration information of the at least one API provider domain function entity that is successfully updated registration with the CAPIF core function entity on the basis of validation. Further, the processor is configured to configure the received updated configuration information to the individual API provider domain function entities.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1:
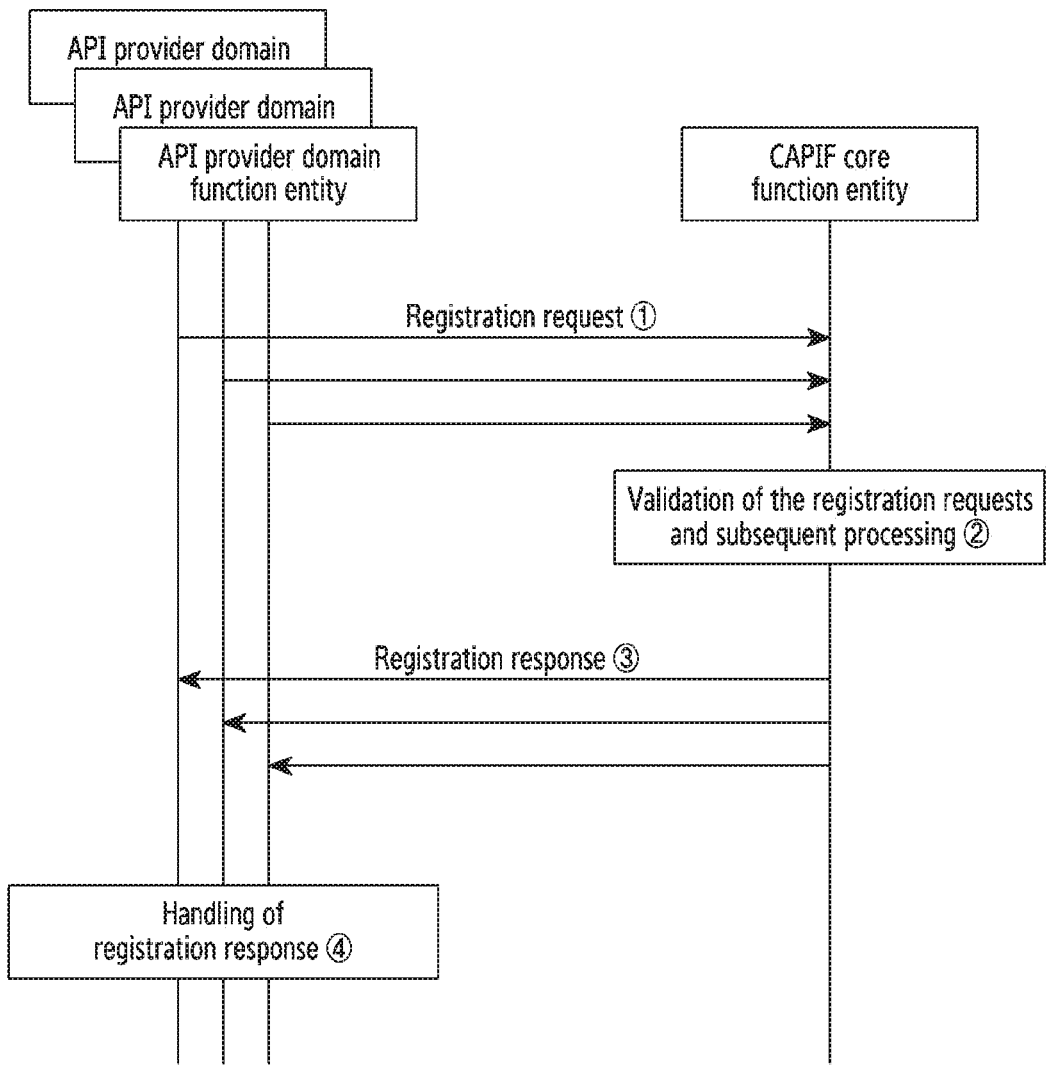
FIG. 1 illustrates a sequence diagram for individual registration of Application Programming Interface (API) provider domain functions on a Common API Framework (CAPIF) core function entity, according to an embodiment disclosed herein.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A principal object of the embodiments disclosed herein is to provide a method and apparatus for registering Application Programming Interface (API) provider domain functions on a Common API Frameworks (CAPIF) core function entity.

Another object of the embodiments is to receive a registration request message from an API management function (AMF) entity, where the registration request comprises security information to validate the registration request and a list of API provider domain function entities that require registration on the CAPIF core function entity.

Another object of the embodiments is to validate the registration request message received from the AMF entity based on the security information.

Another object of the embodiments is to generate configuration information of at least one API provider domain function entity from the list of the API provider domain function entities that is successfully registered with the CAPIF core function entity.

Another object of the embodiments is to send a registration response message to the AMF entity, where the registration response message comprises the configuration information of the at least one API provider domain function entity that is successfully registered with the CAPIF core function entity.

Another object of the embodiments is to receive a registration update request message from the AMF entity, where the registration update request comprises security information to validate the registration update request and a list of API provider domain function entities that require registration update on the CAPIF core function entity.

Another object of the embodiments is to validate the registration update request message received from the AMF entity based on the security information.

Another object of the embodiments is to update configuration information of at least one API provider domain function entity from the list of the API provider domain function entities that is successfully updated with the CAPIF core function entity.

Another object of the embodiments is to send a registration update response message to the AMF entity, where the registration update response message comprises the configuration information of the at least one API provider domain function entity that is successfully updated with the CAPIF core function entity.

Another object of the embodiments is to configure the received configuration information to the individual API provider domain function entities.

Another object of the embodiments is to configure the received updated configuration information to the individual API provider domain function entities.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method and apparatus for registering Application Programming Interface (API) provider domain functions on a Common API Frameworks (CAPIF) core function entity. The method includes receiving, by the CAPIF core function entity, a registration request message from an API management function (AMF) entity, where the registration request comprises security information to validate the registration request and a list of API provider domain function entities that require registration on the CAPIF core function entity. Further, the method includes validating, by the CAPIF core function entity, the registration request message received from the AMF entity based on the security information. Further, the method includes generating, by the CAPIF core function entity, configuration information of at least one API provider domain function entity from the list of the API provider domain function entities that is successfully registered with the CAPIF core function entity. Further, the method includes sending, by the CAPIF core function entity, a registration response message to the AMF entity, where the registration response message comprises the configuration information of the at least one API provider domain function entity that is successfully registered with the CAPIF core function entity.

Referring now to the drawings, and more particularly to FIGS. 2A through 8, there are shown preferred embodiments.

FIG. 1 illustrates a sequence diagram for individual registration of Application Programming Interface (API) provider domain functions on a Common API Framework (CAPIF) core function entity, according to an embodiment disclosed herein.

Step 1: Individual API provider domain function entities, such as API exposing functions (AEF), API publishing function (APF), API management function (AMF), send a registration request to the CAPIF core function entity. The registration request should contain security-related information and the role of the individual API provider domain function entity (for e.g., AEF, APF, and AMF).

Step 2: The CAPIF core function entity validates the received requests and generates the identity and other CAPIF security-related information.

Step 3: The CAPIF core function entity sends the generated information in the individual registration response messages to the API provider domain function entities.

Step 4: The API provider domain function entities configure the received information and uses the identity and received security-related information in subsequent CAPIF API invocations.

According to the following descriptions, some embodiments described.

In some embodiments, a method for registering Application Programming Interface (API) provider domain function entities on a Common API Framework (CAPIF) core function entity (200), comprises: receiving, by the CAPIF core function entity (200), a registration request message from an API management function (AMF) entity (100), wherein the registration request comprises security information to validate the registration request and a list of API provider domain function entities that require registration on the CAPIF core function entity (200); validating, by the CAPIF core function entity (200), the registration request message received from the AMF entity (100) based on the security information; generating, by the CAPIF core function entity (200), configuration information for at least one API provider domain function entity from the list of the API provider domain function entities that is successfully registered with the CAPIF core function entity (200) on the basis of validation; and sending, by the CAPIF core function entity (200), a registration response message to the AMF entity (100), wherein the registration response message comprises the configuration information of the registered API provider domain function entities.

In some embodiments, the generating, by the CAPIF core function entity (200), of the configuration information for the registered API provider domain function entities comprises: performing, by the CAPIF core function entity (200), one of: generating the configuration information for the registered API provider domain function entities in response to determining that at least one API provider domain function entity is successfully registered with the CAPIF core function entity (200), wherein the configuration information comprises identities of the registered API provider domain function entities, a security information to be used by the registered API provider domain function entity in subsequent CAPIF API invocations, and a reason for failure of remaining API provider domain function entities from the list of API provider domain function entities; generating the configuration information for the registered API provider domain function entities in response to determining that all the API provider domain function entity listed in the registration request message are successfully registered with the CAPIF core function entity (200), wherein the configuration information comprises a list of identities of the registered API provider domain function entities, and a security information to be used by the API provider domain function entity in subsequent CAPIF API invocations for all the registered API provider domain function entities; and generating the configuration information comprising a reason for failure of all the API provider domain function entity from the list of API provider domain function entities in response to determining that all the API provider domain function entity listed in the registration request message are not successfully registered with the CAPIF core function entity (200).

In some embodiments, A method for updating information of the registered Application Programming Interface (API) provider domain function entities on a Common API Framework (CAPIF) core function entity, comprises: receiving, by the CAPIF core function entity (200), a registration update request message from an API management function (AMF) entity (100), wherein the registration update request comprises security information to validate the registration update request and a list with the updated information of API provider domain function entities that require registration update on the CAPIF core function entity (200); validating, by the CAPIF core function entity (200), the registration update request message received from the AMF entity (100) based on the security information; updating, by the CAPIF core function entity (200), configuration information of at least one registered API provider domain function entity from the list of the API provider domain function entities that is successfully updated with the CAPIF core function entity (200) on the basis of validation; and sending, by the CAPIF core function entity (200), a registration update response message to the AMF entity (100), wherein the registration update response message comprises the configuration information of the at least one of the updated API provider domain function(s).

In some embodiments, the updating, by the CAPIF core function entity (200), the configuration information of at least one of the updated API provider domain function(s), comprises: performing, by the CAPIF core function entity (200), one of: generating the configuration information for the updated API provider domain function(s) in response to determining that at least one API provider domain function entity is successfully updated with the CAPIF core function entity (200), wherein the configuration information comprises identities of the updated API provider domain function(s), a security information to be used by the API provider domain function entity in subsequent CAPIF API invocations for the updated API provider domain function(s), and a reason for failure of remaining API provider domain function entity from the list of API provider domain function entities; generating the configuration information of the updated API provider domain function(s) in response to determining that all the API provider domain function entity listed in the registration request message are successfully updated registration with the CAPIF core function entity (200), wherein the configuration information comprises a list of identities of the updated API provider domain function(s), and a security information to be used by the API provider domain function entity in subsequent CAPIF API invocations for all the updated API provider domain function(s); and generating the configuration information comprising a reason for failure of all the API provider domain function entity from the list of API provider domain function entities in response to determining that all the API provider domain function entity listed in the registration update request message are not successfully updated with the CAPIF core function entity (200).

In some embodiments, a method for registering Application Programming Interface (API) provider domain functions on a Common API Framework (CAPIF) core function entity (200), comprises: sending, by an API management function (AMF) entity (100), a registration request message to the CAPIF core function entity (200), wherein the registration request comprises security information to validate the registration request and a list of API provider domain function entities that require registration on the CAPIF core function entity (200); receiving, by the AMF entity (100), a registration response message from the CAPIF core function entity (200), wherein the registration response message comprises configuration information of the at least one API provider domain function entity that is successfully registered with the CAPIF core function entity (200) on the basis of validation; and configuring, by the AMF entity (100), the received configuration information to the individual API provider domain function entities.

In some embodiments, the configuration information comprises identities of the at least one of the registered API provider domain function entities, a security information to be used by the API provider domain function entity in subsequent CAPIF API invocations, and a reason for failure of remaining API provider domain function entity from the list of API provider domain function entities when the at least one API provider domain function entity is successfully registered with the CAPIF core function entity (200).

In some embodiments, the configuration information comprises a list of identities of the registered API provider domain function entities and security information to be used by the API provider domain function entity in subsequent CAPIF API invocations for all the registered API provider domain function entities when all the API provider domain function entity listed in the registration request message are successfully registered with the CAPIF core function entity (200).

In some embodiments, the configuration information comprising a reason for failure of all the API provider domain function entity from the list of API provider domain function entities when all the API provider domain function entity listed in the registration request message are not successfully registered with the CAPIF core function entity (200).

In some embodiments, A method for registering Application Programming Interface (API) provider domain functions on a Common API Framework (CAPIF) core function entity, comprises: sending, by an API management function (AMF) entity (100), a registration update request message to the CAPIF core function entity (200), wherein the registration update request comprises security information to validate the registration request and a list of API provider domain function entities that require registration on the CAPIF core function entity (200); receiving, by the AMF entity (100), a registration update response message from the CAPIF core function entity (200), wherein the registration update response message comprises configuration information of the at least one API provider domain function entity that is successfully updated registration with the CAPIF core function entity (200) on the basis of validation; and configuring, by the AMF entity (100), the received updated configuration information to the individual API provider domain function entities.

In some embodiments, the updated configuration information comprises identities of the at least one of the updated API provider domain function entity, a security information to be used by the API provider domain function entity in subsequent CAPIF API invocations for at least one of the updated API provider domain function entity, and a reason for failure of remaining API provider domain function entity from the list of API provider domain function entities when the at least one API provider domain function entity is successfully updated registration with the CAPIF core function entity (200).

In some embodiments, the updated configuration information comprises a list of identities of the updated API provider domain function entity and security information to be used by the API provider domain function entity in subsequent CAPIF API invocations for all the updated API provider domain function entity when all the API provider domain function entity listed in the registration request message are successfully updated registration with the CAPIF core function entity (200).

In some embodiments, the updated configuration information comprising a reason for failure of all the API provider domain function entity from the list of API provider domain function entities when all the API provider domain function entity listed in the registration request message are not successfully updated registration with the CAPIF core function entity (200).

In some embodiments, an API management function (AMF) entity (100) for registering Application Programming Interface (API) provider domain functions on a Common API Framework (CAPIF) core function entity (200), comprises: a memory (110); and a processor (120), coupled with the memory (110), configured to: send a registration request message to the CAPIF core function entity (200), wherein the registration request comprises security information to validate the registration request and a list of API provider domain function entities that require registration on the CAPIF core function entity (200); receive a registration response message from the CAPIF core function entity (200), wherein the registration response message comprises configuration information of the at least one API provider domain function entity that is successfully registered with the CAPIF core function entity (200) on the basis of validation; and configure the received configuration information to the individual API provider domain function entities.

In some embodiments, the configuration information comprises identities of the at least one API provider domain function entity that is successfully registered with the CAPIF core function entity (200), a security information to be used by the API provider domain function entity in subsequent CAPIF API invocations for the at least one API provider domain function entity that is successfully registered with the CAPIF core function entity (200), and a reason for failure of remaining API provider domain function entity from the list of API provider domain function entities when the at least one API provider domain function entity is successfully registered with the CAPIF core function entity (200).

In some embodiments, the configuration information comprises a list of identities of the API provider domain function entity that is successfully registered with the CAPIF core function entity (200) and security information to be used by the API provider domain function entity in subsequent CAPIF API invocations for all the API provider domain function entity that are successfully registered with the CAPIF core function entity (200) when all the API provider domain function entity listed in the registration request message are successfully registered with the CAPIF core function entity (200).

In some embodiments, the configuration information comprising a reason for failure of all the API provider domain function entity from the list of API provider domain function entities when all the API provider domain function entity listed in the registration request message are not successfully registered with the CAPIF core function entity (200).

In some embodiments, An API management function (AMF) entity (100) for registering Application Programming Interface (API) provider domain functions on a Common API Framework (CAPIF) core function entity (200), comprises: a memory (110); and a processor (120), coupled with the memory (110), configured to: send a registration update request message to the CAPIF core function entity (200), wherein the registration update request comprises security information to validate the registration request and a list of API provider domain function entities that require registration on the CAPIF core function entity (200); receive a registration update response message from the CAPIF core function entity (200), wherein the registration update response message comprises configuration information of the at least one API provider domain function entity that is successfully updated registration with the CAPIF core function entity (200) on the basis of validation; and configure the received updated configuration information to the individual API provider domain function entities. In some embodiments, wherein the updated configuration information comprises identities of the at least one API provider domain function entity that is successfully updated registration with the CAPIF core function entity (200), a security information to be used by the API provider domain function entity in subsequent CAPIF API invocations for the at least one API provider domain function entity that is successfully updated registration with the CAPIF core function entity (200), and a reason for failure of remaining API provider domain function entity from the list of API provider domain function entities when the at least one API provider domain function entity is successfully updated registration with the CAPIF core function entity (200).

In some embodiments, wherein the updated configuration information comprises a list of identities of the API provider domain function entity that is successfully updated registration with the CAPIF core function entity (200) and security information to be used by the API provider domain function entity in subsequent CAPIF API invocations for all the API provider domain function entity that are successfully updated registration with the CAPIF core function entity (200) when all the API provider domain function entity listed in the registration request message are successfully updated registration with the CAPIF core function entity (200).

In some embodiments, wherein the updated configuration information comprising a reason for failure of all the API provider domain function entity from the list of API provider domain function entities when all the API provider domain function entity listed in the registration request message are not successfully updated registration with the CAPIF core function entity (200).

In some embodiments, a Common Application Programming Interface Framework (CAPIF) core function entity (200) for registering API provider domain function entities on the CAPIF core function entity (200), comprises: a memory (210); and a processor (220), coupled with the memory (210), configured to: receive a registration request message from an API management function (AMF) entity (100), wherein the registration request comprises security information to validate the registration request and a list of API provider domain function entities that require registration on the CAPIF core function entity (200); validate the registration request message received from the AMF entity (100) based on the security information; generate configuration information of at least one API provider domain function entity from the list of the API provider domain function entities that is successfully registered with the CAPIF core function entity (200) on the basis of validation; and send a registration response message to the AMF entity (100), wherein the registration response message comprises the configuration information of the at least one API provider domain function entity that is successfully registered with the CAPIF core function entity (200).

In some embodiments, the generating, by the CAPIF core function entity (200), the configuration information of at least one API provider domain function entity from the list of the API provider domain function entities that is successfully registered with the CAPIF core function entity (200) comprises: determining, by the CAPIF core function entity (200), whether the list of the API provider domain function entities is successfully registered with the CAPIF core function entity (200); and performing, by the CAPIF core function entity (200), one of: generating the configuration information of the at least one API provider domain function entity from the list of the API provider domain function entities that is successfully registered with the CAPIF core function entity (200) in response to determining that the at least one API provider domain function entity is successfully registered with the CAPIF core function entity (200), wherein the configuration information comprises identities of the at least one API provider domain function entity that is successfully registered with the CAPIF core function entity (200), a security information to be used by the API provider domain function entity in subsequent CAPIF API invocations for the at least one API provider domain function entity that is successfully registered with the CAPIF core function entity (200), and a reason for failure of remaining API provider domain function entity from the list of API provider domain function entities; generating the configuration information of the list of the API provider domain function entities that is successfully registered with the CAPIF core function entity (200) in response to determining that all the API provider domain function entity listed in the registration request message are successfully registered with the CAPIF core function entity (200), wherein the configuration information comprises a list of identities of the API provider domain function entity that is successfully registered with the CAPIF core function entity (200), and a security information to be used by the API provider domain function entity in subsequent CAPIF API invocations for all the API provider domain function entity that are successfully registered with the CAPIF core function entity (200); and generating the configuration information comprising a reason for failure of all the API provider domain function entity from the list of API provider domain function entities in response to determining that all the API provider domain function entity listed in the registration request message are not successfully registered with the CAPIF core function entity (200).

In some embodiments, A Common Application Programming Interface Framework (CAPIF) core function entity (200) for registering API provider domain function entities on the CAPIF core function entity (200), comprises: a memory (210); and a processor (220), coupled with the memory (210), configured to: receive a registration update request message from an API management function (AMF) entity (100), wherein the registration update request comprises security information to validate the registration update request and a list of API provider domain function entities that require registration update on the CAPIF core function entity (200); validate the registration update request message received from the AMF entity (100) based on the security information; update configuration information of at least one API provider domain function entity from the list of the API provider domain function entities that is successfully updated with the CAPIF core function entity (200) on the basis of validation; and send a registration update response message to the AMF entity (100), wherein the registration update response message comprises the configuration information of the at least one API provider domain function entity that is successfully updated with the CAPIF core function entity (200).

In some embodiments, wherein updating, by the CAPIF core function entity (200), the configuration information of at least one API provider domain function entity from the list of the API provider domain function entities that is successfully updated with the CAPIF core function entity (200), comprises: determining, by the CAPIF core function entity (200), whether the list of the API provider domain function entities is successfully updated registration with the CAPIF core function entity (200); performing, by the CAPIF core function entity (200), one of: generating the configuration information of the at least one API provider domain function entity from the list of the API provider domain function entities that is successfully updated registration with the CAPIF core function entity (200) in response to determining that the at least one API provider domain function entity is successfully updated with the CAPIF core function entity (200), wherein the configuration information comprises identities of the at least one API provider domain function entity that is successfully updated registration with the CAPIF core function entity (200), a security information to be used by the API provider domain function entity in subsequent CAPIF API invocations for the at least one API provider domain function entity that is successfully updated registration with the CAPIF core function entity (200), and a reason for failure of remaining API provider domain function entity from the list of API provider domain function entities; generating the configuration information of the list of the API provider domain function entities that is successfully updated registration with the CAPIF core function entity (200) in response to determining that all the API provider domain function entity listed in the registration request message are successfully updated registration with the CAPIF core function entity (200), wherein the configuration information comprises a list of identities of the API provider domain function entity that is successfully updated registration with the CAPIF core function entity (200), and a security information to be used by the API provider domain function entity in subsequent CAPIF API invocations for all the API provider domain function entity that are successfully updated registration with the CAPIF core function entity (200); and generating the configuration information comprising a reason for failure of all the API provider domain function entity from the list of API provider domain function entities in response to determining that all the API provider domain function entity listed in the registration request message are not successfully updated registration with the CAPIF core function entity (200).

The individual registration method described in FIG. 1 can be very resource-intensive as each API provider domain function entity may have multiple API exposing functions hosted in each domain. The network resource consumption increases exponentially with increase in the number of API provider domains hosted by the CAPIF core function entity.

Information flows for API provider domain function entities registering on CAPIF core function entity individually,

TABLE 1

| Registration request | |
|---|---|
| Information element | Description |
| Security information | Information for CAPIF core function entity to validate the registration request |
| Role information | Role of the API provider domain entity (e.g. AEF, APF, AMF) |

TABLE 2

| Registration response | |
|---|---|
| Information element | Description |
| Security information | Information, such as identity, to be used by the API provider domain function entity in subsequent CAPIF API invocations. Provided when registration is successful. |
| Reason | Information related to registration result. Provided when the registration fails. |

Figure 2A:
FIG. 2A illustrates a registration method of API provider domain function entities on the CAPIF core function entity, according to an embodiment as disclosed herein.

FIG. 2A illustrates a registration method of API provider domain function entities on the CAPIF core function entity (200), according to an embodiment as disclosed herein. The registration method includes the AMF entity (100) and the CAPIF core function entity (200).

In an embodiment, the CAPIF core function entity (200) is configured to receive a registration request message from the AMF entity (100), where the registration request comprises security information to validate the registration request and a list of API provider domain function entities that require registration on the CAPIF core function entity (200). Further, the CAPIF core function entity (200) is configured to validate the registration request message received from the AMF entity (100) based on the security information. Further, the CAPIF core function entity (200) is configured to generate configuration information of at least one API provider domain function entity from the list of the API provider domain function entities that is successfully registered with the CAPIF core function entity (200). Further, the CAPIF core function entity (200) is configured to send a registration response message to the AMF entity (100), where the registration response message comprises the configuration information of the at least one API provider domain function entity that is successfully registered with the CAPIF core function entity (200).

In an embodiment, the CAPIF core function entity (200) is configured to determine whether the list of the API provider domain function entities is successfully registered with the CAPIF core function entity (200). Further, the CAPIF core function entity (200) is configured to perform one of, generate the configuration information of the at least one API provider domain function entity from the list of the API provider domain function entities that is successfully registered with the CAPIF core function entity (200), generate the configuration information of the list of the API provider domain function entities that is successfully registered with the CAPIF core function entity (200), and generate the configuration information comprising a reason for failure of all the API provider domain function entity from the list of API provider domain function entities.

In an embodiment, the CAPIF core function entity (200) is configured to receive a registration update request message from the AMF entity (100), where the registration update request comprises security information to validate the registration update request and a list of API provider domain function entities that require registration update on the CAPIF core function entity (200). Further, the CAPIF core function entity (200) is configured to validate the registration update request message received from the AMF entity (100) based on the security information. Further, the CAPIF core function entity (200) is configured to update configuration information of at least one API provider domain function entity from the list of the API provider domain function entities that is successfully updated with the CAPIF core function entity (200). Further, the CAPIF core function entity (200) is configured to send a registration update response message to the AMF entity (100), where the registration update response message comprises the configuration information of the at least one API provider domain function entity that is successfully updated with the CAPIF core function entity (200).

In an embodiment, the CAPIF core function entity (200) is configured to determine whether the list of the API provider domain function entities is successfully updated registration with the CAPIF core function entity (200). Further, the CAPIF core function entity (200) is configured to perform one of generate the configuration information of the at least one API provider domain function entity from the list of the API provider domain function entities that is successfully updated registration with the CAPIF core function entity (200), generate the configuration information of the list of the API provider domain function entities that is successfully updated registration with the CAPIF core function entity (200), and generate the configuration information comprising a reason for failure of all the API provider domain function entity from the list of API provider domain function entities.

In an embodiment, the AMF entity (100) is configured to send a registration request message to the CAPIF core function entity (200), where the registration request comprises security information to validate the registration request and a list of API provider domain function entities that require registration on the CAPIF core function entity (200). Further, the AMF entity (100) is configured to receive a registration response message from the CAPIF core function entity (200), where the registration response message comprises the configuration information of the at least one API provider domain function entity that is successfully registered with the CAPIF core function entity (200). Further, the AMF entity (100) is configured to configure the received configuration information to the individual API provider domain function entities.

In an embodiment, the configuration information comprises identities of the at least one API provider domain function entity that is successfully registered with the CAPIF core function entity (200), a security information to be used by the API provider domain function entity in subsequent CAPIF API invocations for the at least one API provider domain function entity that is successfully registered with the CAPIF core function entity (200), and a reason for failure of remaining API provider domain function entity from the list of API provider domain function entities when the at least one API provider domain function entity is successfully registered with the CAPIF core function entity (200).

In an embodiment, the configuration information comprises a list of identities of the API provider domain function entity that is successfully registered with the CAPIF core function entity (200) and security information to be used by the API provider domain function entity in subsequent CAPIF API invocations for all the API provider domain function entity that are successfully registered with the CAPIF core function entity (200) when all the API provider domain function entity listed in the registration request message are successfully registered with the CAPIF core function entity (200).

In an embodiment, the configuration information comprising a reason for failure of all the API provider domain function entity from the list of API provider domain function entities when all the API provider domain function entity listed in the registration request message are not successfully registered with the CAPIF core function entity (200).

In an embodiment, the AMF entity (100) is configured to send a registration update request message to the CAPIF core function entity (200), where the registration update request comprises security information to validate the registration request and a list of API provider domain function entities that require registration on the CAPIF core function entity (200). Further, the AMF entity (100) is configured to receive a registration update response message from the CAPIF core function entity (200), where the registration update response message comprises the configuration information of the at least one API provider domain function entity that is successfully updated registration with the CAPIF core function entity (200). Further, the AMF entity (100) is configured to configure the received updated configuration information to the individual API provider domain function entities.

In an embodiment, the updated configuration information comprises identities of the at least one API provider domain function entity that is successfully updated registration with the CAPIF core function entity (200), a security information to be used by the API provider domain function entity in subsequent CAPIF API invocations for the at least one API provider domain function entity that is successfully updated registration with the CAPIF core function entity (200), and a reason for failure of remaining API provider domain function entity from the list of API provider domain function entities when the at least one API provider domain function entity is successfully updated registration with the CAPIF core function entity (200).

In an embodiment, the updated configuration information comprises a list of identities of the API provider domain function entity that is successfully updated registration with the CAPIF core function entity (200) and security information to be used by the API provider domain function entity in subsequent CAPIF API invocations for all the API provider domain function entity that are successfully updated registration with the CAPIF core function entity (200) when all the API provider domain function entity listed in the registration request message are successfully updated registration with the CAPIF core function entity (200).

In an embodiment, the updated configuration information comprising a reason for failure of all the API provider domain function entity from the list of API provider domain function entities when all the API provider domain function entity listed in the registration request message are not successfully updated registration with the CAPIF core function entity (200).

Figure 2B:
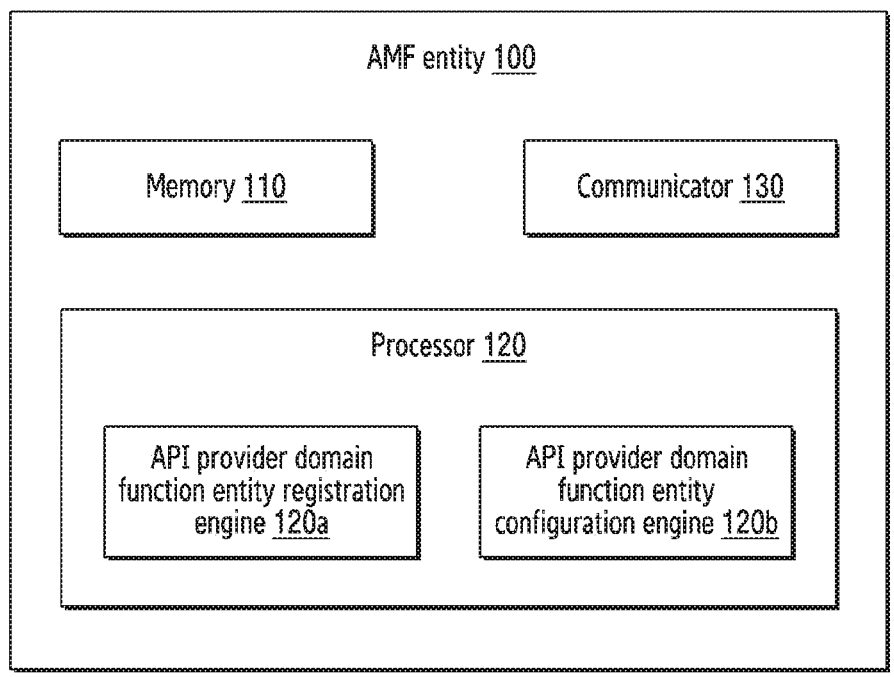
FIG. 2B illustrates a block diagram of an API management function (AMF) entity for registering API provider domain function entities on the CAPIF core function entity, according to an embodiment as disclosed herein.

FIG. 2B illustrates a block diagram of the AMF entity (100) for registering API provider domain function entities on the CAPIF core function entity (200), according to an embodiment as disclosed herein. The AMF entity (100) includes a memory (110), a processor (120), and a communicator (130).

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). In an embodiment, the memory (110) can be an internal storage unit or it can be an external storage unit of the AMF entity (100), a cloud storage, or any other type of external storage.

The processor (120) is configured to execute instructions stored in the memory (110) and to perform various processes. The processor (120) includes an API provider domain function entity registration (120a), and an API provider domain function entity configuration engine (120b).

The API provider domain function entity registration (120a) sends the registration request message to the CAPIF core function entity (200), where the registration request comprises security information to validate the registration request and the list of API provider domain function entities that require registration on the CAPIF core function entity (200). Further, the API provider domain function entity registration (120a) receives the registration response message from the CAPIF core function entity (200), where the registration response message comprises the configuration information of the at least one API provider domain function entity that is successfully registered with the CAPIF core function entity (200). Further, the API provider domain function entity registration (120a) sends the registration update request message to the CAPIF core function entity (200), where the registration update request comprises security information to validate the registration request and the list of API provider domain function entities that require registration on the CAPIF core function entity (200). Further, the API provider domain function entity registration (120a) receives the registration update response message from the CAPIF core function entity (200), where the registration update response message comprises the configuration information of the at least one API provider domain function entity that is successfully updated registration with the CAPIF core function entity (200).

The API provider domain function entity configuration engine (120b) configures the received configuration information to the individual API provider domain function entities.

In an embodiment, the configuration information comprises identities of the at least one API provider domain function entity that is successfully registered with the CAPIF core function entity (200), a security information to be used by the API provider domain function entity in subsequent CAPIF API invocations for the at least one API provider domain function entity that is successfully registered with the CAPIF core function entity (200), and a reason for failure of remaining API provider domain function entity from the list of API provider domain function entities when the at least one API provider domain function entity is successfully registered with the CAPIF core function entity (200).

In an embodiment, the configuration information comprises a list of identities of the API provider domain function entity that is successfully registered with the CAPIF core function entity (200) and security information to be used by the API provider domain function entity in subsequent CAPIF API invocations for all the API provider domain function entity that are successfully registered with the CAPIF core function entity (200) when all the API provider domain function entity listed in the registration request message are successfully registered with the CAPIF core function entity (200).

In an embodiment, the configuration information comprising a reason for failure of all the API provider domain function entity from the list of API provider domain function entities when all the API provider domain function entity listed in the registration request message are not successfully registered with the CAPIF core function entity (200).

In an embodiment, the API provider domain function entity configuration engine (120b) configures the received updated configuration information to the individual API provider domain function entities.

In an embodiment, the updated configuration information comprises identities of the at least one API provider domain function entity that is successfully updated registration with the CAPIF core function entity (200), a security information to be used by the API provider domain function entity in subsequent CAPIF API invocations for the at least one API provider domain function entity that is successfully updated registration with the CAPIF core function entity (200), and a reason for failure of remaining API provider domain function entity from the list of API provider domain function entities when the at least one API provider domain function entity is successfully updated registration with the CAPIF core function entity (200).

In an embodiment, the updated configuration information comprises a list of identities of the API provider domain function entity that is successfully updated registration with the CAPIF core function entity (200) and security information to be used by the API provider domain function entity in subsequent CAPIF API invocations for all the API provider domain function entity that are successfully updated registration with the CAPIF core function entity (200) when all the API provider domain function entity listed in the registration request message are successfully updated registration with the CAPIF core function entity (200).

In an embodiment, the updated configuration information comprising a reason for failure of all the API provider domain function entity from the list of API provider domain function entities when all the API provider domain function entity listed in the registration request message are not successfully updated registration with the CAPIF core function entity (200).

The communicator (130) is configured for communicating internally between internal hardware components and with external entities via one or more networks.

Although the FIG. 2B shows various hardware components of the AMF entity (100) but it is to be understood that other embodiments are not limited thereon. In other embodiments, the AMF entity (100) may include less or more number of components. Further, the labels or names of the components are used only for illustrative purpose and does not limit the scope of the disclosure. One or more components can be combined together to perform same or substantially similar function to register API provider domain function entities on the CAPIF core function entity (200).

Figure 2C:
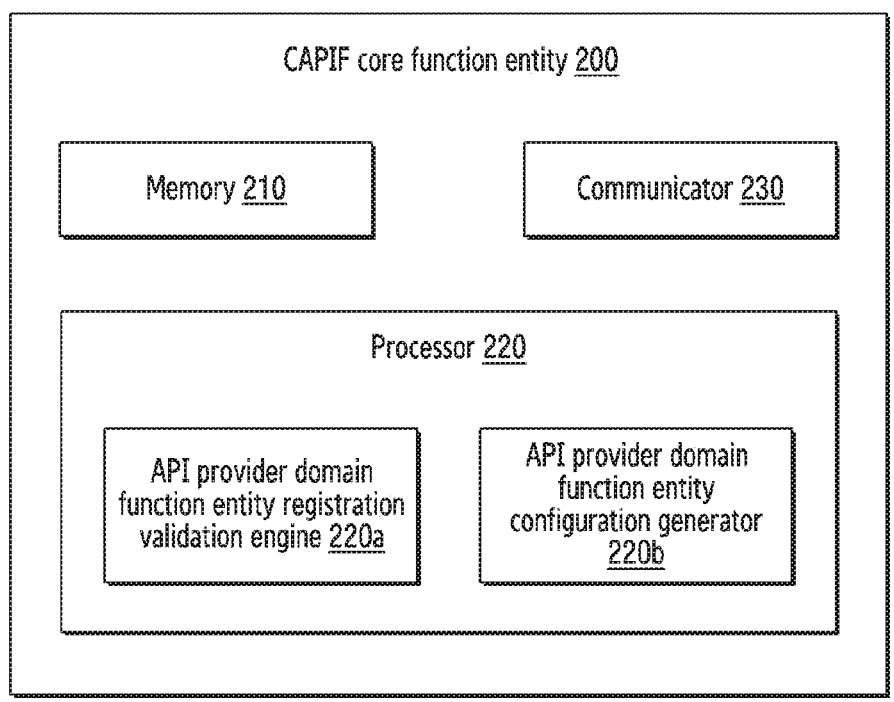
FIG. 2C illustrates a block diagram of the CAPIF core function entity for registering API provider domain function entities, according to an embodiment as disclosed herein.

FIG. 2C illustrates a block diagram of the CAPIF core function entity (200) for registering API provider domain function entities, according to an embodiment as disclosed herein. The CAPIF core function entity (200) includes a memory (210), a processor (220), and a communicator (230).

The memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). In an embodiment, the memory (210) can be an internal storage unit or it can be an external storage unit of the CAPIF core function entity (200), a cloud storage, or any other type of external storage.

The processor (220) is configured to execute instructions stored in the memory (210) and to perform various processes. The processor (220) includes an API provider domain function entity registration validation engine (220*a*), and an API provider domain function entity configuration generator (220*b*).

The API provider domain function entity registration validation engine (220*a*) receives the registration request message from the AMF entity (100). Further, the API provider domain function entity registration validation engine (220*a*) validates the registration request message received from the AMF entity (100) based on the security information. Further, the API provider domain function entity registration validation engine (220*a*) receives the registration update request message from the AMF entity (100). Further, the API provider domain function entity registration validation engine (220*a*) validates the registration update request message received from the AMF entity (100) based on the security information.

The API provider domain function entity configuration generator (220*b*) generates configuration information of at least one API provider domain function entity from the list of the API provider domain function entities that is successfully registered with the CAPIF core function entity (200). Further, the API provider domain function entity configuration generator (220*b*) sends the registration response message to the AMF entity (100). Further, the API provider domain function entity configuration generator (220*b*) determines whether the list of the API provider domain function entities is successfully registered with the CAPIF core function entity (200).

In an embodiment, the API provider domain function entity configuration generator (220*b*) generates the configuration information of the at least one API provider domain function entity from the list of the API provider domain function entities that is successfully registered with the CAPIF core function entity (200) in response to determining that the at least one API provider domain function entity is successfully registered with the CAPIF core function entity (200), where the configuration information comprises identities of the at least one API provider domain function entity that is successfully registered with the CAPIF core function entity (200), a security information to be used by the API provider domain function entity in subsequent CAPIF API invocations for the at least one API provider domain function entity that is successfully registered with the CAPIF core function entity (200), and a reason for failure of remaining API provider domain function entity from the list of API provider domain function entities.

In an embodiment, the API provider domain function entity configuration generator (220*b*) generates the configuration information of the list of the API provider domain function entities that is successfully registered with the CAPIF core function entity (200) in response to determining that all the API provider domain function entity listed in the registration request message are successfully registered with the CAPIF core function entity (200), where the configuration information comprises a list of identities of the API provider domain function entity that is successfully registered with the CAPIF core function entity (200), and a security information to be used by the API provider domain function entity in subsequent CAPIF API invocations for all the API provider domain function entity that are successfully registered with the CAPIF core function entity (200).

In an embodiment, the API provider domain function entity configuration generator (220*b*) generates the configuration information comprising a reason for failure of all the API provider domain function entity from the list of API provider domain function entities in response to determining that all the API provider domain function entity listed in the registration request message are not successfully registered with the CAPIF core function entity (200).

The API provider domain function entity configuration generator (220*b*) updates configuration information of at least one API provider domain function entity from the list of the API provider domain function entities that is successfully updated with the CAPIF core function entity (200). Further, the API provider domain function entity configuration generator (220*b*) sends the registration update response message to the AMF entity (100). Further, the API provider domain function entity configuration generator (220*b*) determines whether the list of the API provider domain function entities is successfully updated registration with the CAPIF core function entity (200).

In an embodiment, the API provider domain function entity configuration generator (220*b*) generates the configuration information of the at least one API provider domain function entity from the list of the API provider domain function entities that is successfully updated registration with the CAPIF core function entity (200) in response to determining that the at least one API provider domain function entity is successfully updated with the CAPIF core function entity (200), where the configuration information comprises identities of the at least one API provider domain function entity that is successfully updated registration with the CAPIF core function entity (200), a security information to be used by the API provider domain function entity in subsequent CAPIF API invocations for the at least one API provider domain function entity that is successfully updated registration with the CAPIF core function entity (200), and a reason for failure of remaining API provider domain function entity from the list of API provider domain function entities.

In an embodiment, the API provider domain function entity configuration generator (220*b*) generates the configuration information of the list of the API provider domain function entities that is successfully updated registration with the CAPIF core function entity (200) in response to determining that all the API provider domain function entity listed in the registration request message are successfully updated registration with the CAPIF core function entity (200), where the configuration information comprises a list of identities of the API provider domain function entity that is successfully updated registration with the CAPIF core function entity (200), and a security information to be used by the API provider domain function entity in subsequent CAPIF API invocations for all the API provider domain function entity that are successfully updated registration with the CAPIF core function entity (200).

In an embodiment, the API provider domain function entity configuration generator (220*b*) generates the configuration information comprising a reason for failure of all the API provider domain function entity from the list of API provider domain function entities in response to determining that all the API provider domain function entity listed in the registration request message are not successfully updated registration with the CAPIF core function entity (200).

The communicator (230) is configured for communicating internally between internal hardware components and with external entities via one or more networks.

Although the FIG. 2C shows various hardware components of the CAPIF core function entity (200) but it is to be understood that other embodiments are not limited thereon. In other embodiments, the CAPIF core function entity (200) may include less or more number of components. Further, the labels or names of the components are used only for illustrative purpose and does not limit the scope of the disclosure. One or more components can be combined together to perform same or substantially similar function to register API provider domain function entities on the CAPIF core function entity (200).

Figure 3:
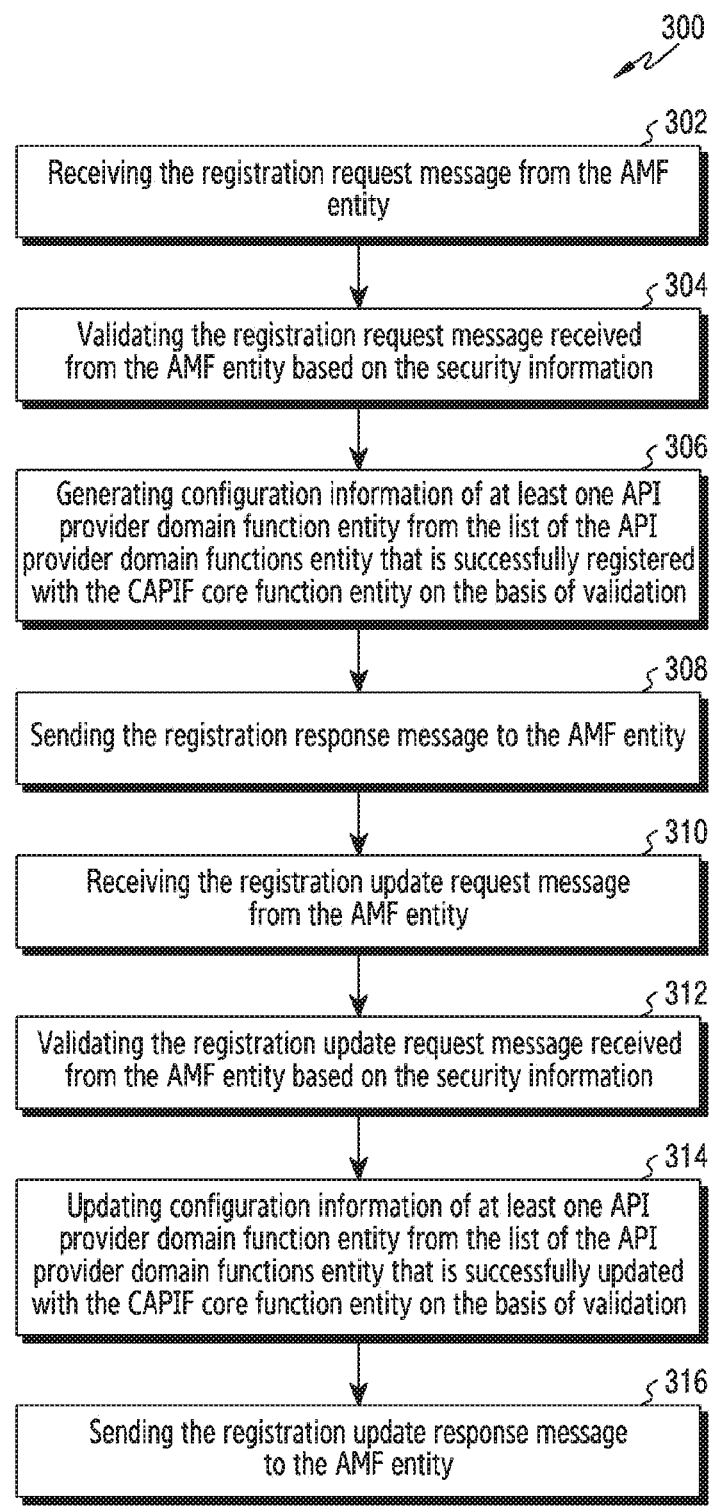
FIG. 3 is a flow diagram illustrating various operations by the CAPIF core function entity for registering API provider domain function entities on the CAPIF core function entity, according to an embodiment as disclosed herein.

FIG. 3 is a flow diagram (300) illustrating various operations by the CAPIF core function entity (200) for registering API provider domain function entities on the CAPIF core function entity (200), according to an embodiment as disclosed herein.

At 302, the method includes receiving the registration request message from the AMF entity (100). At 304, the method includes validating the registration request message received from the AMF entity (100) based on the security information. At 306, the method includes generating configuration information of at least one API provider domain function entity from the list of the API provider domain function entities that is successfully registered with the CAPIF core function entity (200) on the basis of validation. At 308, the method includes sending the registration response message to the AMF entity (100). At 310, the method includes receiving the registration update request message from the AMF entity (100). At 312, the method includes validating the registration update request message received from the AMF entity (100) based on the security information. At 314, the method includes updating configuration information of at least one API provider domain function entity from the list of the API provider domain function entities that is successfully updated with the CAPIF core function entity (200) on the basis of validation. At 316, the method includes sending the registration update response message to the AMF entity (100).

Figure 4:
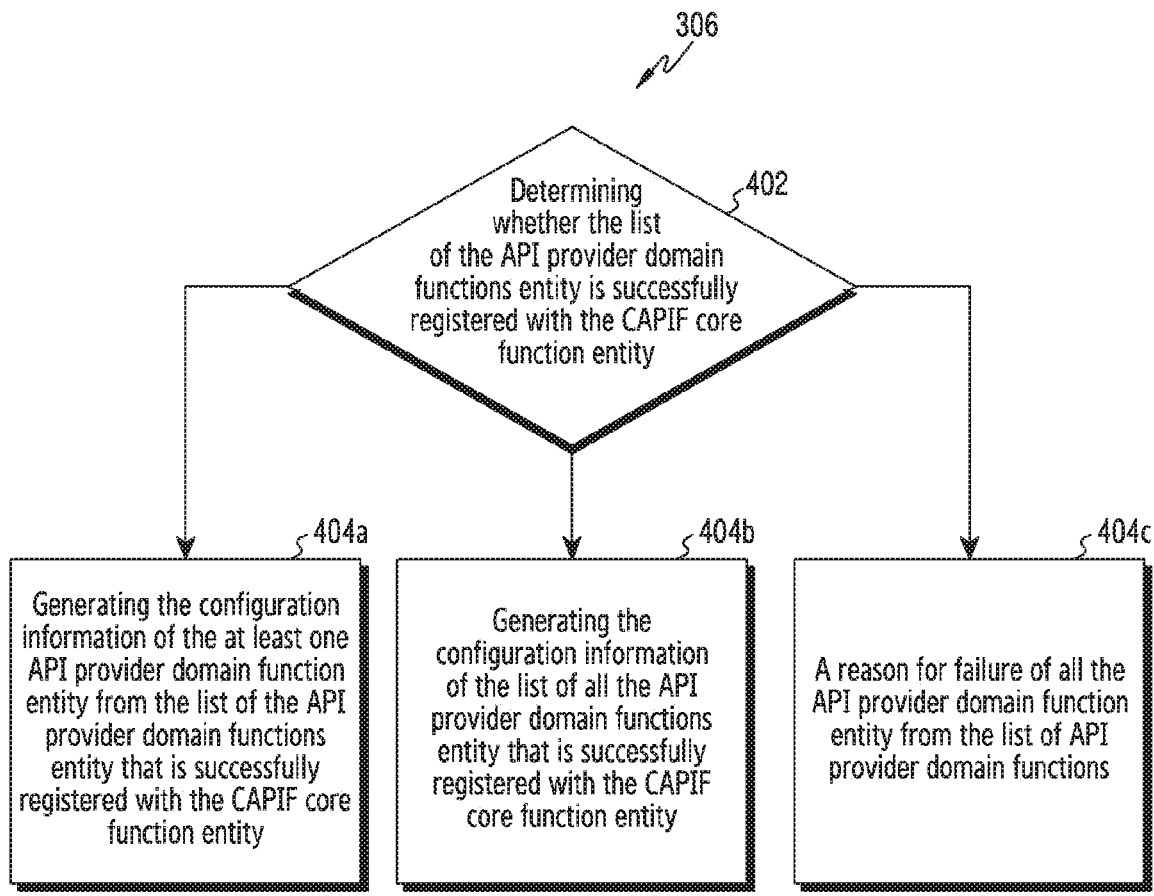
FIG. 4 is a flow diagram illustrating various operations by the CAPIF core function entity for generating configuration information of at least one API provider domain function entity from a list of the API provider domain function entities that is successfully registered with the CAPIF core function entity, according to an embodiment as disclosed herein.

FIG. 4 is a flow diagram (306) illustrating various operations by the CAPIF core function entity (200) for generating configuration information of at least one API provider domain function entity from a list of the API provider domain function entities that is successfully registered with the CAPIF core function entity (200), according to an embodiment as disclosed herein.

At 402, the method includes determining whether the list of the API provider domain function entities is successfully registered with the CAPIF core function entity (200). At 404a, the method includes generating the configuration information of the at least one API provider domain function entity from the list of the API provider domain function entities that is successfully registered with the CAPIF core function entity (200). At 404b, the method includes generating the configuration information of the list of the API provider domain function entities that is successfully registered with the CAPIF core function entity (200). At 404c, the method includes a reason for failure of all the API provider domain function entity from the list of API provider domain function entities.

Figure 5:
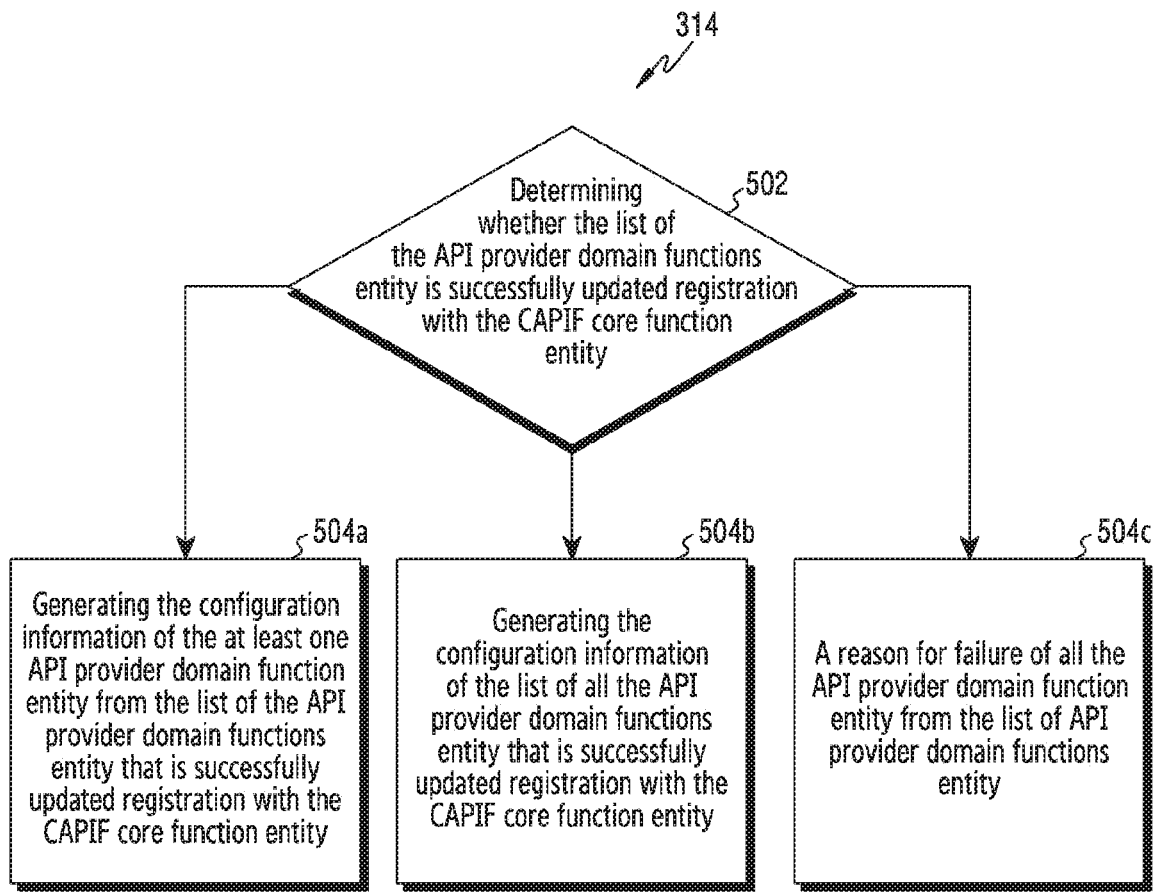
FIG. 5 is a flow diagram illustrating various operations by the CAPIF core function entity for updating configuration information of at least one API provider domain function entity from the list of the API provider domain function entities that is successfully updated with the CAPIF core function entity, according to an embodiment as disclosed herein.

FIG. 5 is a flow diagram (314) illustrating various operations by the CAPIF core function entity (200) for updating configuration information of at least one API provider domain function entity from the list of the API provider domain function entities that is successfully updated with the CAPIF core function entity (200), according to an embodiment as disclosed herein.

At 502, the method includes determining whether the list of the API provider domain function entities is successfully updated registration with the CAPIF core function entity (200). At 504a, the method includes generating the configuration information of the at least one API provider domain function entity from the list of the API provider domain function entities that is successfully updated registration with the CAPIF core function entity (200). At 504b, the method includes generating the configuration information of the list of the API provider domain function entities that is successfully updated registration with the CAPIF core function entity (200). At 504c, the method includes a reason for failure of all the API provider domain function entity from the list of API provider domain function entities.

Figure 6:
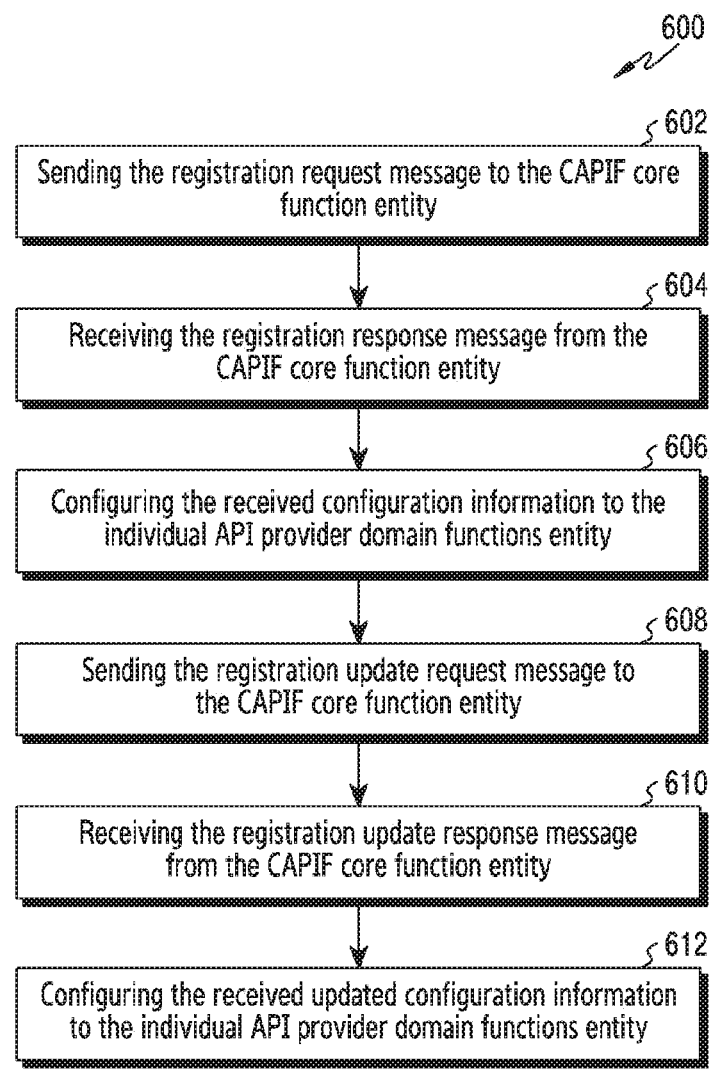
FIG. 6 is a flow diagram illustrating various operations by the AMF entity for registering API provider domain function entities on the CAPIF core function entity, according to an embodiment as disclosed herein.

FIG. 6 is a flow diagram (600) illustrating various operations by the AMF entity (100) for registering API provider domain function entities on the CAPIF core function entity (200), according to an embodiment as disclosed herein.

At 602, the method includes sending the registration request message to the CAPIF core function entity (200). At 604, the method includes receiving the registration response message from the CAPIF core function entity (200). At 606, the method includes configuring the received configuration information to the individual API provider domain function entities. At 608, the method includes sending the registration update request message to the CAPIF core function entity (200). At 610, the method includes receiving the registration update response message from the CAPIF core function entity (200). At 612, the method includes configuring the received updated configuration information to the individual API provider domain function entities.

Figure 7:
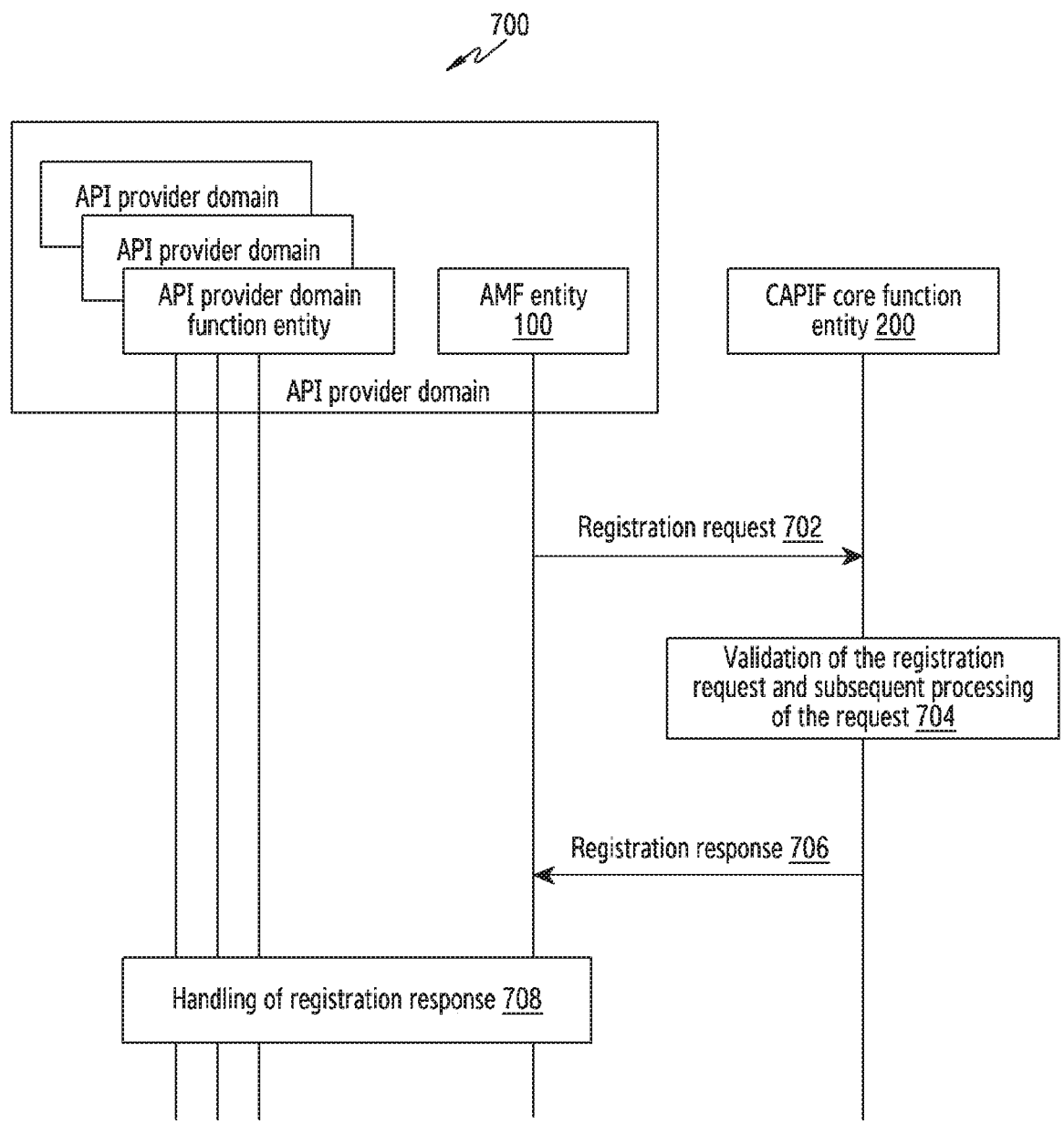
FIG. 7 illustrates a sequence diagram for combine registration of API provider domain function entities on the CAPIF core function entity, according to an embodiment as disclosed herein.

FIG. 7 illustrates a sequence diagram (700) for combine registration of API provider domain function entities on the CAPIF core function entity (200), according to an embodiment as disclosed herein.

At 702, the AMF entity (100) sends the combined registration request to the CAPIF core function entity (200). The registration request contains a list of information about all the API provider domain function entities, which require registration on the CAPIF core function. At 704, the CAPIF core function entity (200) validates the received request and generates the identity and other security-related information for all the API provider domain function entities listed in the request. At 706, the CAPIF core function entity (200) sends the generated information combined in the registration response message to the AMF entity (100). At 708, the AMF entity (100) configures the received information to the individual API provider domain function entities.

Information flows for AMF entity (100) registering on CAPIF core function entity (200) on behalf of API provide domain functions,

TABLE 3

Registration request

| Information element | Description |
|---|---|
| Security information | Information for CAPIF core function entity (200) to validate the registration request |
| List of API provider domain function entities | List of API provider domain function entities including role (e.g. AEF, APF, and AMF) and any specific security information. |

TABLE 4

Registration response

| Information element | Description |
|---|---|
| Security information | Information to be used by the API provider domain function entity in subsequent CAPIF API invocations. Provided when registration is successful. |

TABLE 4-continued

Registration response

| Information element | Description |
|---|---|
| List of identities | List of identities, for each successfully registered API provider domain function entity and any specific security information. |
| Reason | Information related to registration result specific to individual API provider domain function entities. Provided when the registration fails. |

In certain deployments, the API provider domain function entities can be virtualized, with individual functions having multiple virtual instances. In such scenarios, the registration requests described in FIG. 1 and FIG. 7 can contain instance-related information to better handle the virtualized infrastructure with the help of the CAPIF core function. In certain scenarios, the CAPIF core function can assign a single identity to the API provider domain to be used by all the API provider functions.

Figure 8:
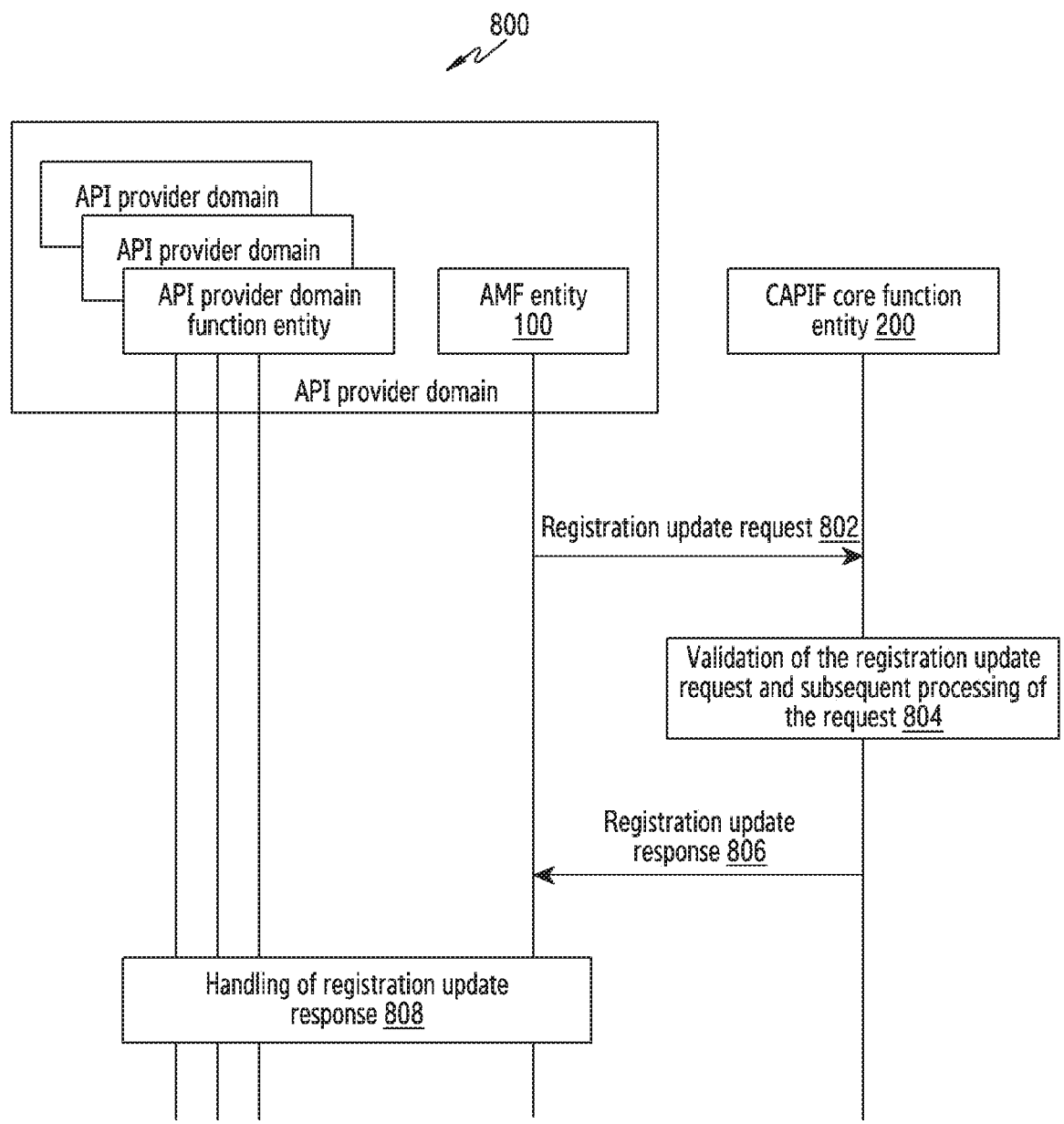
FIG. 8 illustrates a sequence diagram for combine update registration of API provider domain function entities on the CAPIF core function entity, according to an embodiment as disclosed herein.

FIG. 8 illustrates a sequence diagram (800) for combine update registration of API provider domain function entities on the CAPIF core function entity (200), according to an embodiment as disclosed herein.

If needed the API provider domain can update the list of registered API provider domain function entities by sending the registration update to the CAPIF core function entity (200). At 802, the AMF entity (100) sends the registration update request to the CAPIF core function entity (200). The registration update request contains a list of information about all the API provider domain function entities, which require registration update on the CAPIF core function entity (200).

At 804, the CAPIF core function entity (200) validates the received request and updates the identity and other security-related information for all the API provider domain function entities listed in the request. At 806, the CAPIF core function entity (200) sends the updated information combined in the registration update response message to the AMF entity (100). At 808, the AMF entity (100) configures the received information to the individual API provider domain function entities.

Information flows for API management function updating registration information on CAPIF core function entity (200) on behalf of API provide domain functions,

TABLE 5

Registration update request

| Information element | Description |
|---|---|
| Security information | Information for CAPIF core function entity (200) to validate the registration request |
| List of API provider domain function entities requiring update | List of API provider domain function entities requiring updates, including role (e.g. AEF, APF, AMF) and any specific security information. |

TABLE 6

Registration update response

| Information element | Description |
|---|---|
| Security information | Information to be used by the API provider domain function entity in subsequent CAPIF API invocations. Provided when registration update is successful. |
| List of identities | List of identities, for each successfully updated API provider domain function entity and any specific security information. |
| Reason | Information related to registration update result specific to individual API provider domain function entities. Provided when the registration fails. |

In an alternate scenario, the API publishing function or one of the API exposing functions can be enhanced to perform the combined registration procedure described in FIG. 7 or the registration update procedure as described in FIG. 8, on behalf of other API provider domain function entities.

In some embodiments, the method for registering Application Programming Interface (API) provider domain function entities on a Common API Framework (CAPIF) core function entity, comprising: receiving, by the CAPIF core function entity, a registration request message from an API management function (AMF) entity, wherein the registration request message comprises security information to validate the registration request message and a list of API provider domain function entities for registering on the CAPIF core function entity; validating, by the CAPIF core function entity, the registration request message received from the AMF entity based on the security information; generating, by the CAPIF core function entity, configuration information for at least one API provider domain function entities from the list of the API provider domain function entities that successfully registered with the CAPIF core function entity based on the CAPIF core function entity validating the registration request message; and sending, by the CAPIF core function entity, a registration response message to the AMF entity, wherein the registration response message comprises the configuration information of the at least one API provider domain function entities that successfully registered with the CAPIF core function entity.

In some embodiments, the generating of the configuration information for the at least one API provider domain function entities comprises performing, by the CAPIF core function entity that successfully registered with the CAPIF core function entity, at least one of: generating the configuration information for the at least one API provider domain function entities in response to determining that the at least one API provider domain function entities is successfully registered with the CAPIF core function entity, wherein the configuration information comprises identities of the at least one API provider domain function entities, a security information to be used by the at least one API provider domain function entities in subsequent CAPIF API invocations, and a reason for failure of remaining API provider domain function entities from the list of API provider domain function entities; generating the configuration information for the at least one API provider domain function entities in response to determining that all of the API provider domain function entities listed in the registration request message are successfully registered with the CAPIF core function entity, wherein the configuration information comprises a list of identities of the at least one API provider domain function entities, and a security information to be used by the API provider domain function entities in subsequent CAPIF API invocations for all the at least one API provider domain function entities; and generating the configuration information comprising a reason for failure of all the API provider domain function entities from the list of the API provider domain function entities in response to determining that all the API provider domain function entities listed in the registration request message are not successfully registered with the CAPIF core function entity.

In some embodiments, a method for updating information of a registered Application Programming Interface (API) provider domain function entities on a Common API Framework (CAPIF) core function entity, comprising: receiving, by the CAPIF core function entity, a registration update request message from an API management function (AMF) entity, wherein the registration update request message comprises security information to validate the registration update request message and a list with updated information of API provider domain function entities for a registration update on the CAPIF core function entity; validating, by the CAPIF core function entity, the registration update request message received from the AMF entity based on the security information; updating, by the CAPIF core function entity, configuration information of at least one registered API provider domain function entity from the list of the API provider domain function entities that successfully updated with the CAPIF core function entity based on the CAPIF core function entity validating the registration update request message; and sending, by the CAPIF core function entity, a registration update response message to the AMF entity, wherein the registration update response message comprises the configuration information of the at least one registered API provider domain function entity.

In some embodiments, the updating of the configuration information of the at least one of the registered API provider domain function entity, comprises performing, by the CAPIF core function entity, at least one of: generating the configuration information for the at least one registered API provider domain function entity in response to determining that the at least one API provider domain function entity is successfully updated with the CAPIF core function entity, wherein the configuration information comprises identities of the at least one registered API provider domain function entity, a security information to be used by the API provider domain function entity in subsequent CAPIF API invocations for the at least one registered API provider domain function entity, and a reason for failure of remaining API provider domain function entities from the list of the API provider domain function entities; generating the configuration information of the at least one registered API provider domain function entity in response to determining that all of the API provider domain function entities listed in the registration update request message are successfully updated registration with the CAPIF core function entity, wherein the configuration information comprises a list of identities of the at least one registered API provider domain function entity, and a security information to be used by the at least one registered API provider domain function entity in subsequent CAPIF API invocations for all of the registered API provider domain function entities; and generating the configuration information comprising a reason for failure of all the API provider domain function entities from the list of the API provider domain function entities in response to determining that all of the API provider domain function entities listed in the registration update request message are not successfully updated with the CAPIF core function entity.

In some embodiments, a method for registering Application Programming Interface (API) provider domain functions on a Common API Framework (CAPIF) core function entity, comprises: sending, by an API management function (AMF) entity, a registration request message to the CAPIF core function entity, wherein the registration request message comprises security information to validate the registration request message and a list of API provider domain function entities for registering on the CAPIF core function entity; receiving, by the AMF entity, a registration response message from the CAPIF core function entity, wherein the registration response message comprises configuration information of at least one API provider domain function entity that successfully registered with the CAPIF core function entity based on validating the registration request message; and configuring, by the AMF entity, the configuration information to individual API provider domain function entities.

In some embodiments, when the at least one API provider domain function entity is successfully registered with the CAPIF core function entity, the configuration information comprises: identities of the at least one of the API provider domain function entities, a security information to be used by the at least one API provider domain function entity in subsequent CAPIF API invocations, and a reason for failure of remaining API provider domain function entities from the list of API provider domain function entities.

In some embodiments, when all of the API provider domain function entities listed in the registration request message are successfully registered with the CAPIF core function entity, the configuration information comprises: a list of identities of the at least one API provider domain function entity, and security information to be used by the at least one API provider domain function entity in subsequent CAPIF API invocations for all of the API provider domain function entities.

In some embodiments, when all of the API provider domain function entities listed in the registration request message are not successfully registered with the CAPIF core function entity, the configuration information comprises a reason for failure of all of the at least one API provider domain function entity from the list of API provider domain function entities.

In some embodiments, a method for registering Application Programming Interface (API) provider domain functions on a Common API Framework (CAPIF) core function entity, comprises: sending, by an API management function (AMF) entity, a registration update request message to the CAPIF core function entity, wherein the registration update request comprises security information to validate the registration update request message and a list of API provider domain function entities for registering on the CAPIF core function entity; receiving, by the AMF entity, a registration update response message from the CAPIF core function entity, wherein the registration update response message comprises configuration information of at least one API provider domain function entity that successfully updated registration with the CAPIF core function entity based on validating the registration update request message; and configuring, by the AMF entity, the configuration information to individual API provider domain function entities.

In some embodiments, when the registration of the at least one API provider domain function entity is successfully updated with the CAPIF core function entity, the configuration information comprises: identities of updated API provider domain function entities, a security information to be used by the at least one API provider domain function entity in subsequent CAPIF API invocations for the updated API provider domain function entities, and a reason for failure of remaining API provider domain function entities from the list of API provider domain function entities.

In some embodiments, when the registration of all of the API provider domain function entities listed in the registration update request message are successfully updated with the CAPIF core function entity, the configuration information comprises: a list of identities of updated API provider domain function entities, and security information to be used by the at least one API provider domain function entity in subsequent CAPIF API invocations for all of the updated API provider domain function entities.

In some embodiments, when the registration of all the API provider domain function entities listed in the registration update request message are not successfully updated with the CAPIF core function entity, the configuration information comprises a reason for failure of all the API provider domain function entity from the list of API provider domain function entities.

In some embodiments, an API management function (AMF) entity for registering Application Programming Interface (API) provider domain functions on a Common API Framework (CAPIF) core function entity, comprises: a memory; and a processor, coupled with the memory, configured to: send a registration request message to the CAPIF core function entity, wherein the registration request message comprises security information to validate the registration request message and a list of API provider domain function entities for registering on the CAPIF core function entity; receive a registration response message from the CAPIF core function entity, wherein the registration response message comprises configuration information of at least one API provider domain function entity that successfully registered with the CAPIF core function entity based on validating of the registration request message; and configure the configuration information to the API provider domain function entities.

In some embodiments, when the at least one API provider domain function entity is successfully registered with the CAPIF core function entity, the configuration information comprises: identities of the at least one API provider domain function entity that is successfully registered with the CAPIF core function entity, a security information to be used by the at least one API provider domain function entity in subsequent CAPIF API invocations for the at least one API provider domain function entity that is successfully registered with the CAPIF core function entity, and a reason for failure of remaining API provider domain function entities from the list of API provider domain function entities.

In some embodiments, when all of the API provider domain function entities listed in the registration request message are successfully registered with the CAPIF core function entity, the configuration information comprises: a list of identities of the at least one API provider domain function entity that is successfully registered with the CAPIF core function entity, and security information to be used by the at least one API provider domain function entity in subsequent CAPIF API invocations for all of the API provider domain function entities that are successfully registered with the CAPIF core function entity.

In some embodiments, when all of the API provider domain function entities listed in the registration request message are not successfully registered with the CAPIF core function entity, the configuration information comprises: a reason for failure of all of the at least one API provider domain function entity from the list of API provider domain function entities.

In some embodiments, an API management function (AMF) entity for registering Application Programming Interface (API) provider domain functions on a Common API Framework (CAPIF) core function entity, comprises: a memory; and a processor, coupled with the memory, configured to: send a registration update request message to the CAPIF core function entity, wherein the registration update request comprises security information to validate the registration update request message and a list of API provider domain function entities for registering on the CAPIF core function entity; receive a registration update response message from the CAPIF core function entity, wherein the registration update response message comprises configuration information of at least one API provider domain function entity that successfully updated registration with the CAPIF core function entity based on validating the registration update request message; and configure the configuration information to the API provider domain function entities.

In some embodiments, when the registration of the at least one API provider domain function entity is successfully updated with the CAPIF core function entity, the configuration information comprises: identities of the at least one API provider domain function entity that successfully updated the registration with the CAPIF core function entity, a security information to be used by the at least one API provider domain function entity in subsequent CAPIF API invocations for the at least one API provider domain function entity that successfully updated the registration with the CAPIF core function entity, and a reason for failure of remaining API provider domain function entities from the list of API provider domain function entities.

In some embodiments, when the registration of all of the API provider domain function entities listed in the registration update request message are successfully updated with the CAPIF core function entity, the configuration information comprises: a list of identities of the at least one API provider domain function entity that the registration is successfully updated with the CAPIF core function entity; and security information to be used by the at least one API provider domain function entity in subsequent CAPIF API invocations for all of the API provider domain function entities that successfully updated the registration with the CAPIF core function entity.

In some embodiments, when the registration of all of the API provider domain function entities listed in the registration update request message are not successfully updated with the CAPIF core function entity, the configuration information comprises a reason for failure of all the API provider domain function entity from the list of API provider domain function entities.

In some embodiments, a Common Application Programming Interface Framework (CAPIF) core function entity for registering API provider domain function entities on the CAPIF core function entity, comprises: a memory; and a processor, coupled with the memory (210), configured to: receive a registration request message from an API management function (AMF) entity, wherein the registration request message comprises security information to validate the registration request message and a list of API provider domain function entities for registering on the CAPIF core function entity; validate the registration request message received from the AMF entity based on the security information; generate configuration information of at least one API provider domain function entities from the list of the API provider domain function entities that successfully registered with the CAPIF core function entity based on the CAPIF core function entity validating the registration request message; and send a registration response message to the AMF entity, wherein the registration response message comprises the configuration information of the at least one API provider domain function entities that successfully registered with the CAPIF core function entity.

In some embodiments, to generate the configuration information of the at least one API provider domain function entities from the list of the API provider domain function entities that successfully registered with the CAPIF core function entity the processor is configured to: determine whether the list of the API provider domain function entities is successfully registered with the CAPIF core function entity; and perform, at least one of: generate the configuration information of the at least one API provider domain function entities from the list of the API provider domain function entities that successfully registered with the CAPIF core function entity in response to determining that the at least one API provider domain function entities is successfully registered with the CAPIF core function entity, wherein the configuration information comprises identities of the at least one API provider domain function entities that successfully registered with the CAPIF core function entity, a security information to be used by the at least one API provider domain function entities in subsequent CAPIF API invocations for the at least one API provider domain function entities that successfully registered with the CAPIF core function entity, and a reason for failure of remaining API provider domain function entities from the list of the API provider domain function entities; generate the configuration information of the list of the API provider domain function entities that successfully registered with the CAPIF core function entity in response to determining that all the API provider domain function entities listed in the registration request message are successfully registered with the CAPIF core function entity, wherein the configuration information comprises a list of identities of the at least one API provider domain function entities that successfully registered with the CAPIF core function entity, and a security information to be used by the API provider domain function entities in subsequent CAPIF API invocations for all the API provider domain function entities that are successfully registered with the CAPIF core function entity; and generate the configuration information comprising a reason for failure of all the API provider domain function entities from the list of the API provider domain function entities in response to determining that all the API provider domain function entities listed in the registration request message are not successfully registered with the CAPIF core function entity.

In some embodiments, a Common Application Programming Interface Framework (CAPIF) core function entity for registering API provider domain function entities on the CAPIF core function entity, comprises: a memory; and a processor, coupled with the memory, configured to: receive a registration update request message from an API management function (AMF) entity, wherein the registration update request message comprises security information to validate the registration update request message and a list of API provider domain function entities for a registration update on the CAPIF core function entity; validate the registration update request message received from the AMF entity based on the security information; update configuration information of at least one API provider domain function entity from the list of the API provider domain function entities that successfully updated with the CAPIF core function entity based on validating the registration update request message; and send a registration update response message to the AMF entity, wherein the registration update response message comprises the configuration information of the at least one API provider domain function entity that successfully updated with the CAPIF core function entity.

In some embodiments, to update the configuration information of at least one API provider domain function entity from the list of the API provider domain function entities that successfully updated with the CAPIF core function entity, the processor is configured to: determine whether the registration update of the list of the API provider domain function entities with the CAPIF core function entity is successful; and perform at least one of: generate the configuration information of the at least one API provider domain function entity from the list of the API provider domain function entities that successfully updated with the CAPIF core function entity in response to determining that the at least one API provider domain function entity is successfully updated with the CAPIF core function entity, wherein the configuration information comprises identities of the at least one API provider domain function entity that successfully updated with the CAPIF core function entity, a security information to be used by the at least one API provider domain function entity in subsequent CAPIF API invocations for the at least one API provider domain function entity that successfully updated with the CAPIF core function entity, and a reason for failure of remaining API provider domain function entity from the list of the API provider domain function entities; generate the configuration information of the list of the API provider domain function entities that successfully updated with the CAPIF core function entity in response to determining that all of the API provider domain function entities listed in the registration update request message are successfully updated with the CAPIF core function entity, wherein the configuration information comprises a list of identities of the at least one API provider domain function entity that successfully updated with the CAPIF core function entity, and the security information to be used by the at least one API provider domain function entity in subsequent CAPIF API invocations for all of the API provider domain function entities that are successfully updated with the CAPIF core function entity; and generate the configuration information comprising a reason for failure of all the API provider domain function entities from the list of the API provider domain function entities in response to determining that all the API provider domain function entities listed in the registration update request message are not successfully updated with the CAPIF core function entity.

The embodiments disclosed herein can be implemented using at least one software program running on at least one hardware entity and performing network management functions to control the elements.

The foregoing description of the specific embodiments will so fully reveal the general nature of the embodiments herein that others can, by applying current knowledge, readily modify and, or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed:

1. A method performed by a common application program interface (API) framework (CAPIF) core function entity in a communication network, the method comprising:
   receiving, by the CAPIF core function entity, a registration request from an API management function entity, wherein the registration request includes:
   security information for CAPIF core function to validate the registration request, and
   a list of one or more API provider domain functions, which require registration on the CAPIF core function entity;
   validating, by the CAPIF core function entity, the registration request;
   generating, by the CAPIF core function entity, an identity and other security-related information for all API provider domain functions in the list of one or more API provider domain functions; and
   transmitting, by the CAPIF core function entity, the identity and other security-related information in a registration response to the API management function entity,
   wherein the registration response includes a list of at least one identity for at least one API provider domain function successfully registered, and
   wherein, for each API provider domain function in the list of one or more API provider domain functions, the registration response further includes:
   in response to a successful registration, security information to be used by a successfully registered API provider domain function in subsequent CAPIF API invocations, or
   in response to a failed registration, reason information related to a registration failure specific to an individual registration-failed API provider domain function.

2. The method of claim 1,
   wherein the CAPIF core function entity is associated with a public land mobile network (PLMN) and supports a trust domain between the CAPIF core function entity and 3rd party API provider domain, and
   wherein the one or more API provider domain functions include at least one of API exposing function (AEF), API publishing function (APF), or API management function (AMF).

3. The method of claim 1, wherein a single identity for all API provider domain functions in the list of one or more API provider domain functions is assigned by the CAPIF core function entity.

4. A method performed by a common application program interface (API) framework (CAPIF) core function entity in a communication network, the method comprising:
   receiving, by the CAPIF core function entity, a registration update request from an API management function entity, wherein the registration update request includes:
   security information for CAPIF core function to validate the registration update request, and
   a list of one or more API provider domain functions, which require registration update on the CAPIF core function entity;
   validating, by the CAPIF core function entity, the registration update request;
   updating, by the CAPIF core function entity, an identity and other security-related information for all API provider domain functions in the list of one or more API provider domain functions; and
   transmitting, by the CAPIF core function entity, the identity and other security-related information in a registration update response to the API management function entity,
   wherein the registration update response includes a list of at least one identity for at least one API provider domain function successfully updated, and
   wherein, for each API provider domain function in the list of one or more API provider domain functions, the registration response further includes:
   in response to a successful registration, security information to be used by a successfully updated API provider domain function in subsequent CAPIF API invocations, or
   in response to a failed registration, reason information related to a registration update failure specific to an individual update-failed API provider domain function.

5. The method of claim 4,
   wherein the CAPIF core function entity is associated with a public land mobile network (PLMN) and supports a trust domain between the CAPIF core function entity and 3rd party API provider domain, and
   wherein the one or more API provider domain functions include at least one of API exposing function (AEF), API publishing function (APF), or API management function (AMF).

6. The method of claim 4, wherein a single identity for all API provider domain functions in the list of one or more API provider domain functions is assigned by the CAPIF core function entity.

7. A method performed by an application program interface (API) management function entity in a communication network, the method comprising:
   transmitting, by the API management function entity, a registration request to a common API framework (CAPIF) core function entity, wherein the registration request includes:
   security information for CAPIF core function to validate the registration request, and
   a list of one or more API provider domain functions, which require registration on the CAPIF core function entity;
   receiving, by the API management function entity, a registration response from the CAPIF core function entity,
   wherein the registration response includes at least one identity for at least one API provider domain function registered successfully; and
   configuring information in the registration response to one or more individual API provider domain functions,
   wherein, for each API provider domain function in the list of one or more API provider domain functions, the registration response further includes:
   in response to a successful registration, security information to be used by a successfully registered API provider domain function in subsequent CAPIF API invocations, or in response to a failed registration, reason information related to a registration failure specific to an individual registration-failed API provider domain function.

8. The method of claim 7, wherein the CAPIF core function entity is associated with a public land mobile network (PLMN) and supports a trust domain between the CAPIF core function entity and 3rd party API provider domain, and
wherein the one or more API provider domain functions include at least one of API exposing function (AEF), API publishing function (APF), or API management function (AMF).

9. The method of claim 7, wherein a single identity for all API provider domain functions in the list of one or more API provider domain functions is assigned by the CAPIF core function entity.

10. A method performed by an application program interface (API) management function entity in a communication network, the method comprising:
transmitting, by the API management function entity, a registration update request to a common API framework (CAPIF) core function entity, wherein the registration update request includes:
security information for CAPIF core function to validate the registration update request, and
one or more API provider domain functions, which require registration update on the CAPIF core function entity;
receiving, by the API management function entity, a registration update response from the CAPIF core function entity, wherein the registration update response includes configuration information for at least one API provider domain function updated successfully; and
configuring information in the registration update response to one or more individual API provider domain functions,
wherein, for each API provider domain function in the list of one or more API provider domain functions, the registration response further includes:
in response to a successful registration, security information to be used by a successfully updated API provider domain function in subsequent CAPIF API invocations, or
in response to a failed registration, reason information related to a registration update failure specific to an individual update-failed API provider domain function.

11. The method of claim 10,
wherein the CAPIF core function entity is associated with a public land mobile network (PLMN) and supports a trust domain between the CAPIF core function entity and 3rd party API provider domain, and
wherein the one or more API provider domain functions include at least one of API exposing function (AEF), API publishing function (APF), or API management function (AMF).

12. The method of claim 10, wherein a single identity for all API provider domain functions in the list of one or more API provider domain functions is assigned by the CAPIF core function entity.

13. A common application program interface (API) framework (CAPIF) core function entity in a communication network, comprising:

at least one transceiver; and
at least one processor operably coupled to the at least one transceiver, configured to:
receive, by the CAPIF core function entity, a registration request from an API management function entity, wherein the registration request includes:
security information for CAPIF core function to validate the registration request; and
a list of one or more API provider domain functions, which require registration on the CAPIF core function entity,
validate, by the CAPIF core function entity, the registration request,
generate, by the CAPIF core function entity, an identity and other security-related information for all API provider domain function in the list of one or more API provider domain functions, and
transmit, by the CAPIF core function entity, the identity and other security-related information in a registration response to the API management function entity,
wherein the registration response includes a list of at least one identity for at least one API provider domain function successfully registered, and
wherein, for each API provider domain function in the list of one or more API provider domain functions, the registration response further includes:
in response to a successful registration, security information to be used by a successfully registered API provider domain function in subsequent CAPIF API invocations, or
in response to a failed registration, reason information related to a registration failure specific to an individual registration-failed API provider domain function.

14. The CAPIF core function entity of claim 13,
wherein the CAPIF core function entity is associated with a public land mobile network (PLMN) and supports a trust domain between the CAPIF core function entity and 3rd party API provider domain, and
wherein the one or more API provider domain functions include at least one of API exposing function (AEF), API publishing function (APF), or API management function (AMF).

15. The CAPIF core function entity of claim 13, wherein a single identity for all API provider domain functions in the list of one or more API provider domain functions is assigned by the CAPIF core function entity.

16. A common application program interface (API) framework (CAPIF) core function entity in a communication network, comprising:
at least one transceiver; and
at least one processor operably coupled to the at least one transceiver, configured to:
receive, by the CAPIF core function entity, a registration update request from an API management function entity, wherein the registration update request includes:
security information for CAPIF core function to validate the registration update request; and
a list of one or more API provider domain functions, which require registration update on the CAPIF core function entity,
validate, by the CAPIF core function entity, the registration update request,
update, by the CAPIF core function entity, an identity and other security-related information for all API provider domain functions in the list of one or more API provider domain functions, and transmit, by the CAPIF core function entity, the identity and other security-related information in a registration update response to the API management function entity, wherein the registration update response includes a list of at least one identity for at least one API provider domain function, and wherein, for each API provider domain function in the list of one or more API provider domain functions, the registration response further includes at least one of:

in response to a successful registration, security information to be used by a successfully updated API provider domain function in subsequent CAPIF API invocations, or in response to a failed registration, reason information related to a registration update failure specific to an individual update-failed API provider domain function successfully updated.

17. The CAPIF core function entity of claim 16, wherein the CAPIF core function entity is associated with a public land mobile network (PLMN) and supports a trust domain between the CAPIF core function entity and 3rd party API provider domain, and wherein the one or more API provider domain functions include at least one of API exposing function (AEF), API publishing function (APF), or API management function (AMF).

18. The CAPIF core function entity of claim 16, wherein a single identity for all API provider domain functions in the list of one or more API provider domain functions is assigned by the CAPIF core function entity.

19. An application program interface (API) management function entity in a communication network, comprising:

at least one transceiver; and at least one processor operably coupled to the at least one transceiver, configured to:

transmit, by the API management function entity, a registration request to a common API framework (CAPIF) core function entity, wherein the registration request includes:

security information for CAPIF core function to validate the registration request; and a list of one or more API provider domain functions, which require registration on the CAPIF core function entity, receive, by the API management function entity, a registration response from the CAPIF core function entity, wherein the registration response includes at least one identity for at least one API provider domain function registered successfully, and configure information in the registration response to one or more individual API provider domain functions, wherein, for each API provider domain function in the list of one or more API provider domain functions, the registration response further includes:

in response to a successful registration, security information to be used by a successfully registered API provider domain function in subsequent CAPIF API invocations, or in response to a failed registration, reason information related to a registration failure specific to an individual registration-failed API provider domain function.

20. The API management function entity of claim 19, wherein the CAPIF core function entity is associated with a public land mobile network (PLMN) and supports a trust domain between the CAPIF core function entity and 3rd party API provider domain, and wherein the one or more API provider domain functions include at least one of API exposing function (AEF), API publishing function (APF), or API management function (AMF).

21. The API management function entity of claim 19, wherein a single identity for all API provider domain functions in the list of one or more API provider domain functions is assigned by the CAPIF core function entity.

22. An application program interface (API) management function entity in a communication network, comprising:

at least one transceiver; and at least one processor operably coupled to the at least one transceiver, configured to:

transmit, by the API management function entity, a registration update request to a common API framework (CAPIF) core function entity, wherein the registration update request includes:

security information for CAPIF core function to validate the registration update request; and a list of API provider domain functions, which require registration update on the CAPIF core function entity, receive, by the API management function entity, a registration update response from the CAPIF core function entity, wherein the registration update response includes configuration information for at least one API provider domain function updated successfully, and configure information in the registration update response to one or more individual API provider domain functions, wherein, for each API provider domain function in the list of one or more API provider domain functions, the registration response further includes:

in response to a successful registration, security information to be used by a successfully updated API provider domain function in subsequent CAPIF API invocations, or in response to a failed registration, reason information related to a registration update failure specific to an individual update-failed API provider domain function.

23. The API management function entity of claim 22, wherein the CAPIF core function entity is associated with a public land mobile network (PLMN) and supports a trust domain between the CAPIF core function entity and 3rd party API provider domain, and wherein the one or more API provider domain functions include at least one of API exposing function (AEF), API publishing function (APF), or API management function (AMF).

24. The API management function entity of claim 22, wherein a single identity for all API provider domain functions in the list of one or more API provider domain functions is assigned by the CAPIF core function entity.

* * * * *